United States Patent
Jang et al.

(10) Patent No.: US 7,688,405 B2
(45) Date of Patent: Mar. 30, 2010

(54) REFLECTIVE-TRANSMISSIVE TYPE LIQUID CRYSTAL DISPLAY DEVICE

(75) Inventors: Yong-Kyu Jang, Suwon-si (KR); Won-Sang Park, Yongin-si (KR); Jae-Hyun Kim, Seoul (KR); Sang-Woo Kim, Suwon-si (KR); Sung-Eun Cha, Geoje-si (KR); Jae-Young Lee, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 100 days.

(21) Appl. No.: 10/886,564

(22) Filed: Jul. 9, 2004

(65) Prior Publication Data

US 2005/0030454 A1 Feb. 10, 2005

(30) Foreign Application Priority Data

Jul. 9, 2003 (KR) ............... 10-2003-0046504
Jul. 30, 2003 (KR) ............... 10-2003-0052808

(51) Int. Cl.
*G02F 1/1335* (2006.01)
*G02F 1/136* (2006.01)

(52) U.S. Cl. ............................ 349/114; 349/42
(58) Field of Classification Search .......... 349/114
See application file for complete search history.

(56) References Cited

U.S. PATENT DOCUMENTS 6,295,109 B1 * 9/2001 Kubo et al. ............... 349/119
6,542,209 B2 * 4/2003 Kim et al. ................. 349/114
6,697,135 B1 * 2/2004 Baek et al. ................ 349/106
6,864,945 B2 * 3/2005 Fujimori et al. ........... 349/156
7,148,938 B2 * 12/2006 Nakamura et al. ......... 349/106
2002/0154257 A1 * 10/2002 Iijima ......................... 349/67
2004/0032555 A1 * 2/2004 Jin et al. .................... 349/114
2004/0041957 A1 * 3/2004 Yamaguchi et al. ......... 349/43

FOREIGN PATENT DOCUMENTS

| CN | 1392964 | 1/2002 |
| JP | 2000-275660 | 10/2000 |
| KR | 1020020064470 | 8/2002 |
| KR | 1020030034855 | 5/2003 |
| WO | WO 03/019276 | 3/2003 |

\* cited by examiner

*Primary Examiner*—Dung Nguyen
*Assistant Examiner*—Lucy P Chien
(74) *Attorney, Agent, or Firm*—F. Chau & Associates, LLC

(57) ABSTRACT

A reflective-transmissive liquid crystal display (LCD) device with an improved display quality is achieved by forming a reflective area and a transmissive area having a cell gap greater than greater than that of the reflective area. A liquid crystal layer is disposed in a liquid crystal cell between the first and second substrates. The liquid crystal molecules are normally aligned at an angle equal to greater than about 45° with respect to a line parallel to the first substrate. The LCD device operates in a normally black mode.

19 Claims, 24 Drawing Sheets

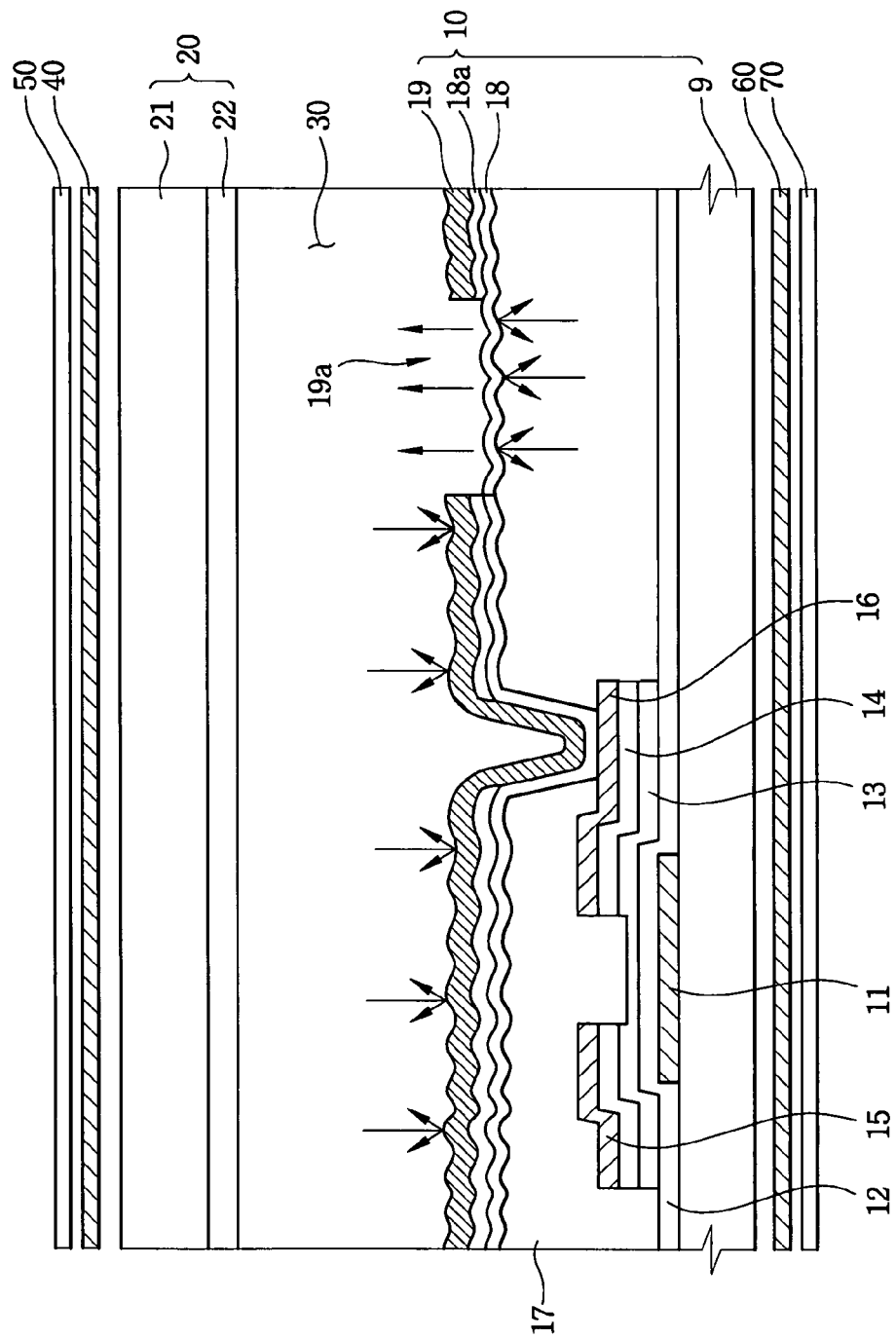

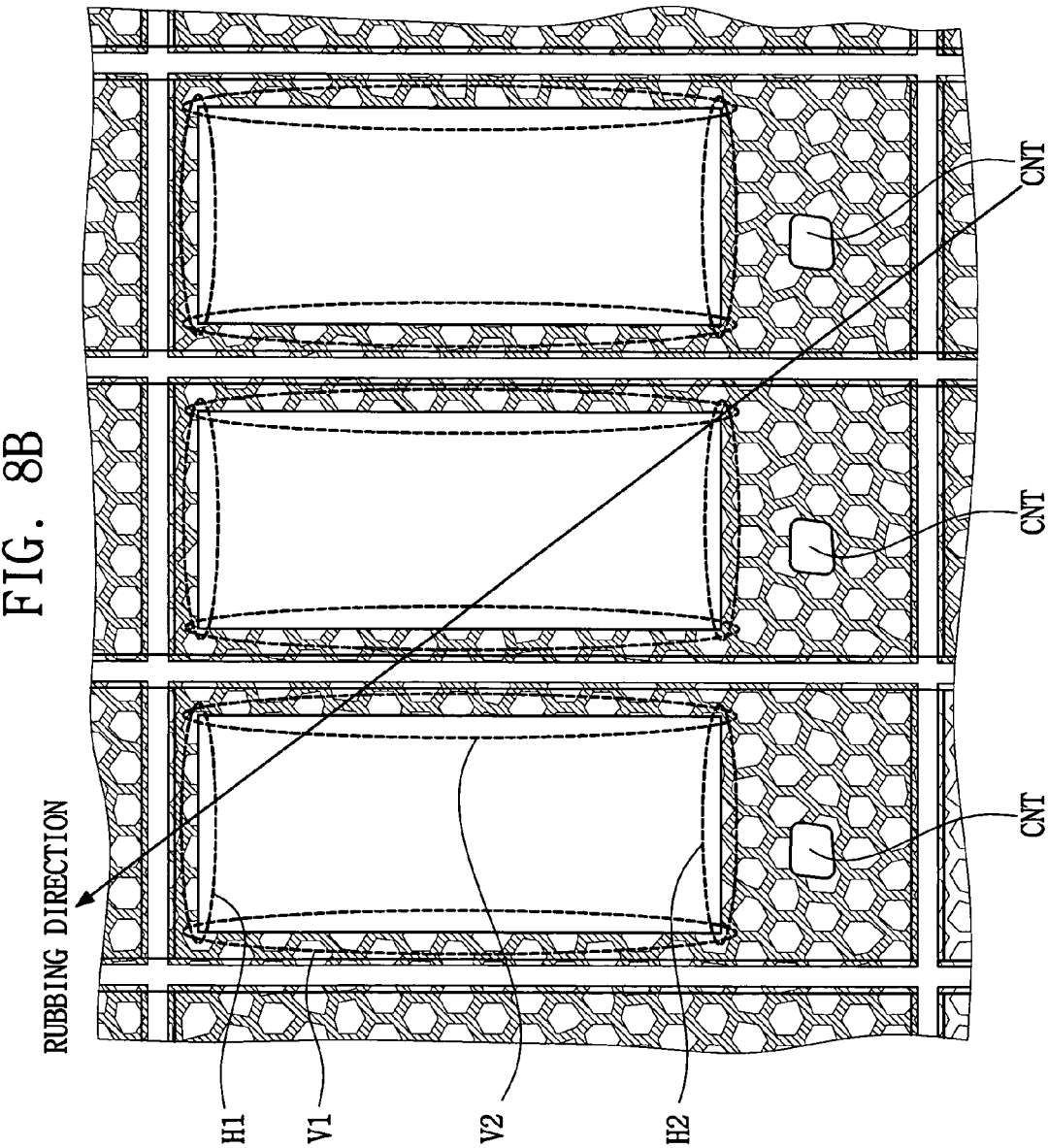

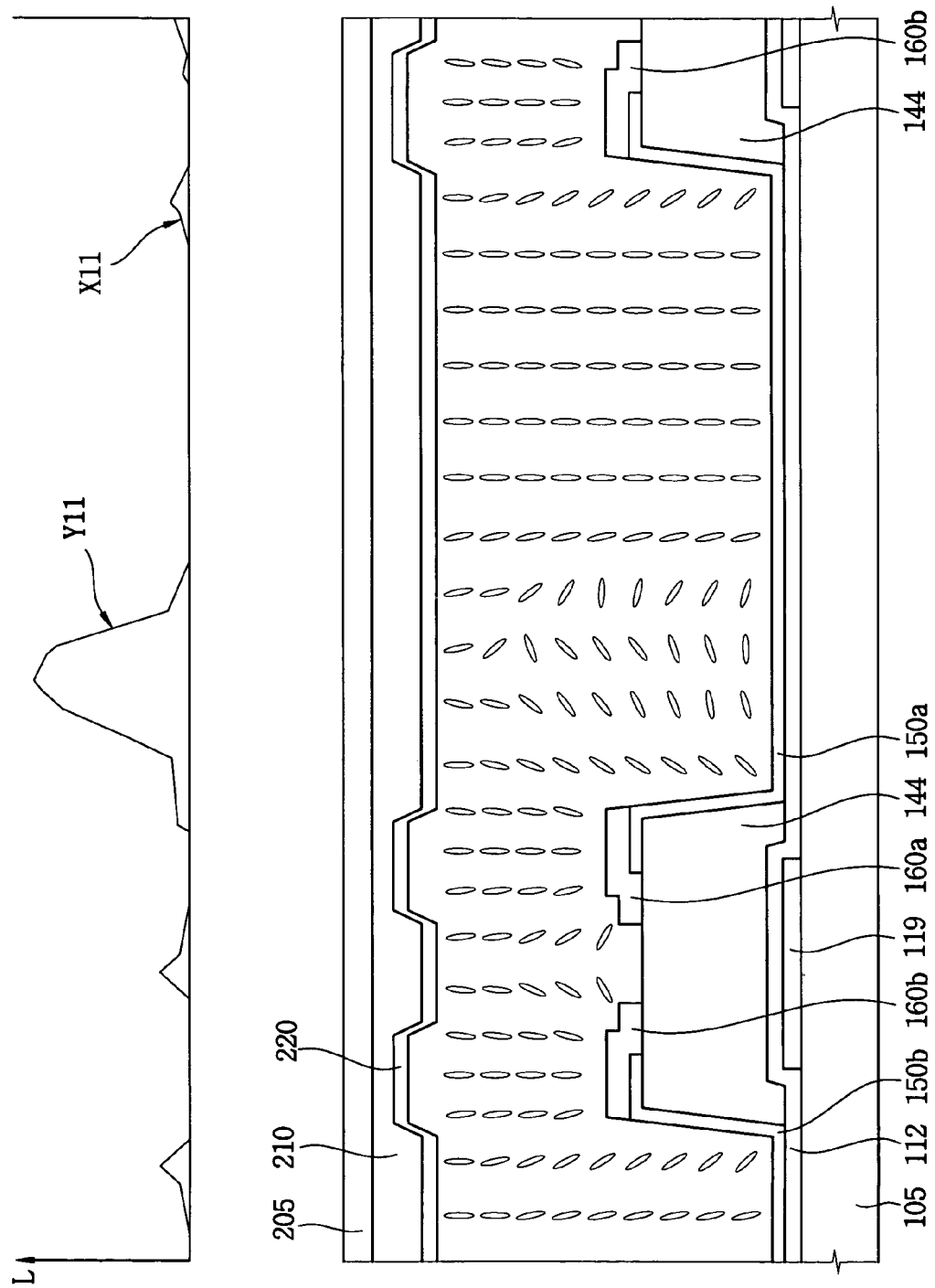

REFLECTIVE-TRANSMISSIVE TYPE LIQUID CRYSTAL DISPLAY DEVICE

BACKGROUND OF THE INVENTION

The present application claims priority from Korean Patent Application Nos. 2003-46504 filed on Jul. 9, 2003 and 2003-52808 filed on Jul. 30, 2003, which are incorporated herein by reference.

FIELD OF THE INVENTION

The present invention is directed to a liquid crystal display (LCD) device and more particularly to a reflective-transmissive type LCD device with an improved display quality and a method of manufacturing the same.

BACKGROUND DESCRIPTION

Generally a reflective type LCD device displays an image using a natural light externally provided to the LCD device. The display quality is heavily depending on the amount of the natural light provided thereto. For example, the reflective type LCD device exhibits poor display characteristics in a dark place due to lack of the natural light. Contrarily, a transmissive type LCD device displays an image using an artificial light from an artificial light-generation unit such as a backlight. Such constant provision of artificial light enables to maintain display characteristics even in dark place. However, generation of the artificial light requires a power storage such as battery. Thus, the transmissive type LCD device is not suitable for certain portable display devices which require reduction in both size and weight. To solve those problems, a reflective-transmissive type LCD device has been introduced, which displays an image by using both the natural light and the artificial light.

FIG. 1 shows a conventional reflective-transmissive LCD device, which comprises an array substrate 10 having a reflective plate 19 formed thereon. The reflective pate 19 defines a reflective region and a transmissive window 19a. A color filter substrate 20 is formed facing the array substrate 10. A liquid crystal layer 30 is formed between the array substrate 10 and the color filter substrate 20. An upper λ/4 phase delay film 40 is formed on the color filter substrate 20 and an upper polarizer 50 is formed on the upper λ/4 phase delay film 40. A lower λ/4 phase delay film 60 is formed under the array substrate 10. A lower polarizer 70 is formed under the lower λ/4 phase delay film 60.

FIGS. 2A and 2B show operations of the reflective-transmissive LCD device shown in FIG. 1. The LCD device displays white when no voltage is applied thereto, commonly known as "normally white". FIG. 2A shows a reflective mode operation and FIG. 2B shows a transmissive mode operation.

In the reflective mode operation, as shown in FIG. 2A, when no voltage is applied ("OFF"), liquid crystal molecules of the liquid crystal layer 30 remain twisted. A light externally provided to the LCD device passes through the upper polarizer 50 and linearly polarized. The light then passes through the upper λ/4 phase delay film 40 and circularly polarized. The light passes through the twisted liquid crystal molecules of the liquid crystal layer 30, which change the phase of the light by λ/4, and linearly polarized. The light is then reflected on the reflective plate 19. The reflected light passes through the liquid crystal layer 30 again, which changes the phase of the light by λ/4, and circularly polarized. The light passes through the upper λ/4 phase delay film 40 and linearly polarized. The linearly polarized light passes through the upper polarizer 50, and white is displayed from the liquid crystal display. This is called "normally white" since the LCD device displays white when no electric field is applied to the liquid crystal layer 30.

When a voltage is applied to the liquid crystal ("ON"), the liquid crystal molecules are vertically aligned. A light externally provided to the LCD device passes through the upper polarizer 50 and linearly polarized. The light then passes through the upper λ/4 phase delay film 40 and circularly polarized. Because the liquid crystal molecules are vertically aligned, the light passes through the liquid crystal layer 30 directly and reflected on the reflective plate 60. The reflected light directly passes through the liquid crystal layer 30, and passes through the upper λ/4 phase delay film 40, which changes the phase of the light by λ/4 and linearly polarizes the light. Due to the difference in the polarization direction, the light is blocked by the upper polarizer 30 and the LCD device displays black.

FIG. 2B shows the transmissive mode operation. When no voltage is applied ("OFF"), the liquid crystal molecules remain twisted. An artificial light provided from below the LCD device passes through the lower polarizer 70 and linearly polarized. The light then passes through the lower λ/4 phase delay film 60 and circularly polarized. The light then passes through a transparent electrode 18. Since the liquid crystal molecules remain twisted, the light from the transparent electrode 18 is linearly polarized by the liquid crystal layer 30. The light passes through the upper λ/4 phase delay film 40, which changes the phase of the light and circularly polarizes the light. The light passes through the polarizer 50 and white is displayed from the LCD device. Thus, the transmissive mode is the "normally white" operation.

When a voltage is applied to the LCD device ("ON"), the liquid crystal molecules of the liquid crystal layer 30 are vertically aligned. The artificial light provided from below the LCD device passes through the polarizer 90 and linearly polarized. The passes through the lower λ/4 phase delay film 60 and circularly polarized. The light then passes through the transparent electrode 18. Since the liquid crystal molecules are vertically aligned in the liquid crystal layer 30, the light passes directly through the liquid crystal layer 30, passes through the upper λ/4 phase delay film 40 and linearly polarized. Due to the difference in the polarization directions, the linearly polarized light is blocked by the upper polarizer 50, and the LCD device displays black.

In the reflective-transmissive LCD device mentioned above, the optical conditions (e.g., polarization, liquid crystal alignment angle, cell gap, etc) are designed to optimize the reflective mode operation, which requires black to be displayed in the transmissive mode operation when electric field is applied. Thus, when no electric field is applied to display white, transmittance is significantly reduced in the transmissive mode because the optical conditions are not designed to optimize the transmissive mode operation.

SUMMARY OF THE INVENTION

An aspect of the present invention is a liquid crystal display (LCD) device having the first and second substrates facing each other. A liquid crystal cell is formed between the first substrate and the second substrate and a liquid crystal layer disposed in the liquid crystal cell. The LCD device has a reflective area having the fist cell gap and a transmissive area having the second cell gap, which is greater than the first cell gap. The liquid crystal layer comprises liquid crystal molecules normally aligned at an angle equal to greater than about 45° with respect to a line parallel to the first substrate.

Another aspect of the present invention is a liquid crystal display (LCD) device having the first and second substrates facing each other. A liquid crystal cell is formed between the first substrate and the second substrate and a liquid crystal layer disposed in the liquid crystal cell. The LCD device has a reflective area having the first cell gap and a transmissive area having the second cell gap, which is greater than the first cell gap. The transmissive area is formed closer to a first corner of the pixel region than other corners of the pixel region.

Another aspect of the present invention is a method for manufacturing a liquid crystal display (LCD) device. A gate line and a data line intersecting the gate line at a first corner of a pixel region are formed on a substrate. A passivation layer is formed to cover the gate line and the data line. An opening is formed in the passivation layer to form a transmissive region in the pixel region. The opening is formed closer to the first corner than other corners of the pixel region.

BRIEF DESCRIPTION OF THE DRAWINGS

The above and other advantages of the present invention will become more apparent by describing in detail exemplary embodiments thereof with reference to the accompanying drawings.

FIG. 1 depicts a cross-sectional view of a conventional reflective-transmissive LCD device.

FIG. 8B depicts a light leakage problem of the LCD device depicted in FIG. 7.

FIG. 9A depicts a cross-sectional view cut along the line B-B' of the LCD device depicted in FIG. 7 and the light leakage and afterimage observed 20 ms after a voltage is applied.

DETAILED DESCRIPTION OF EMBODIMENTS OF THE INVENTION

The invention is directed to improving display qualities of a reflective-transmissive LCD device by designing optical conditions (e.g., polarization, liquid crystal alignment angle, cell gaps, rubbing direction, opening location, light block patterns, etc).

First Embodiment

Figure 2A:
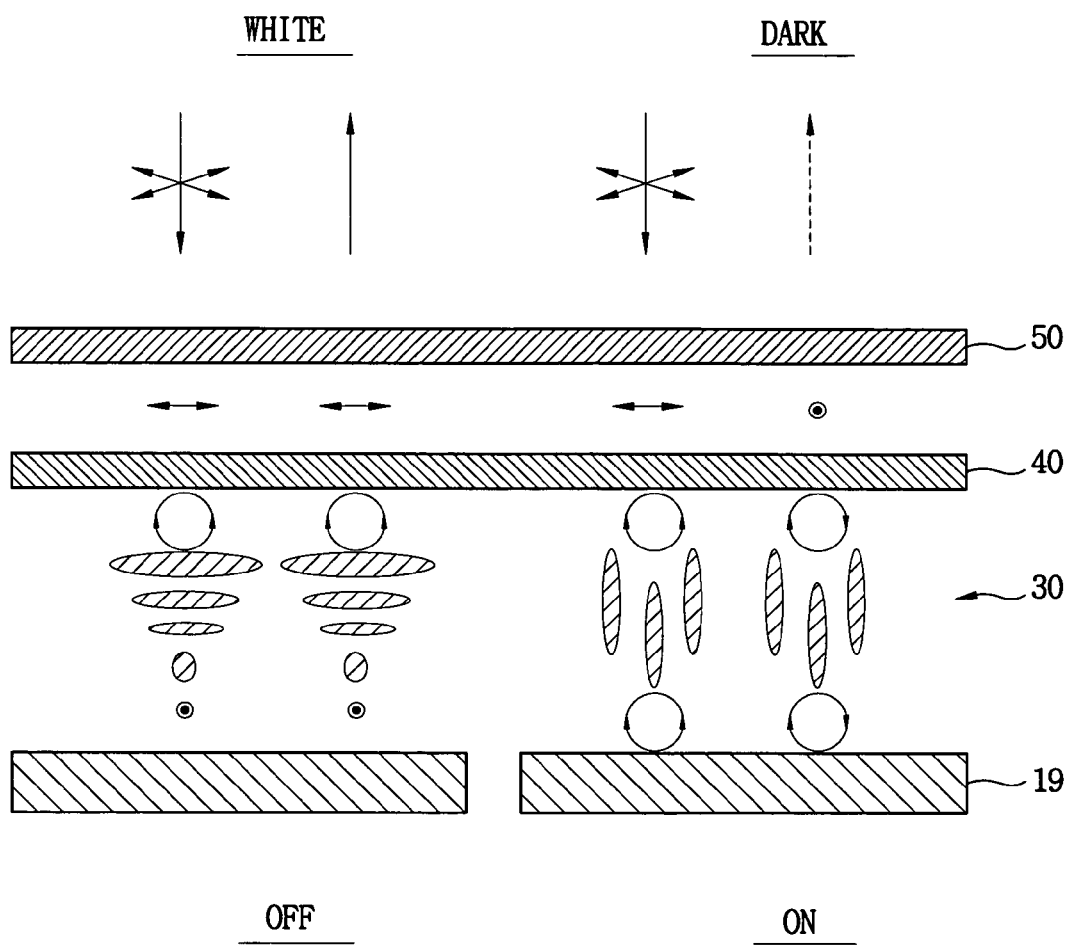
FIG. 2A depicts a reflective mode operation of the LCD device depicted in FIG. 1.
Figure 2B:
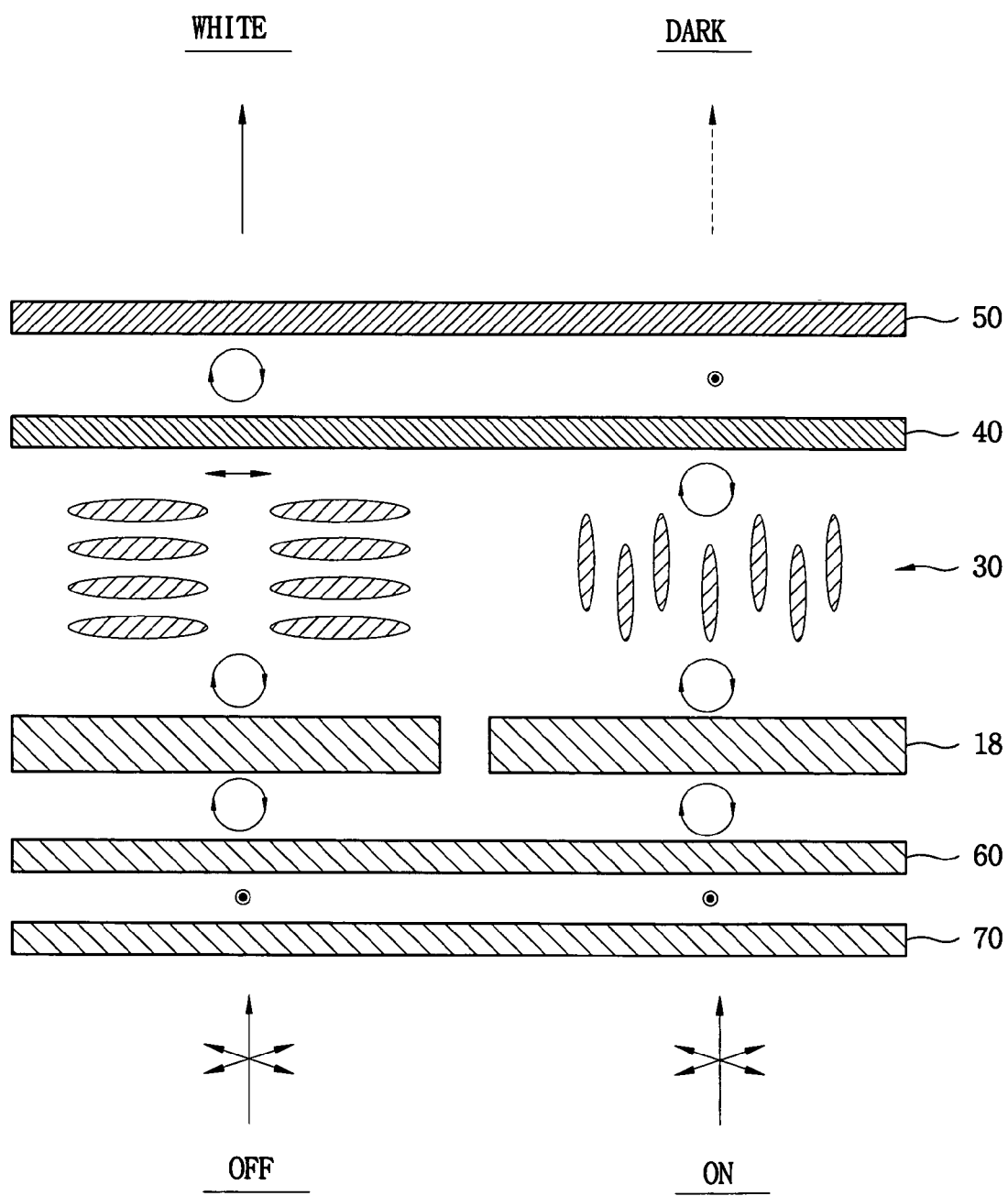
FIG. 2B depicts a transmissive mode operation of the LCD device depicted in FIG. 1.
Figure 3:
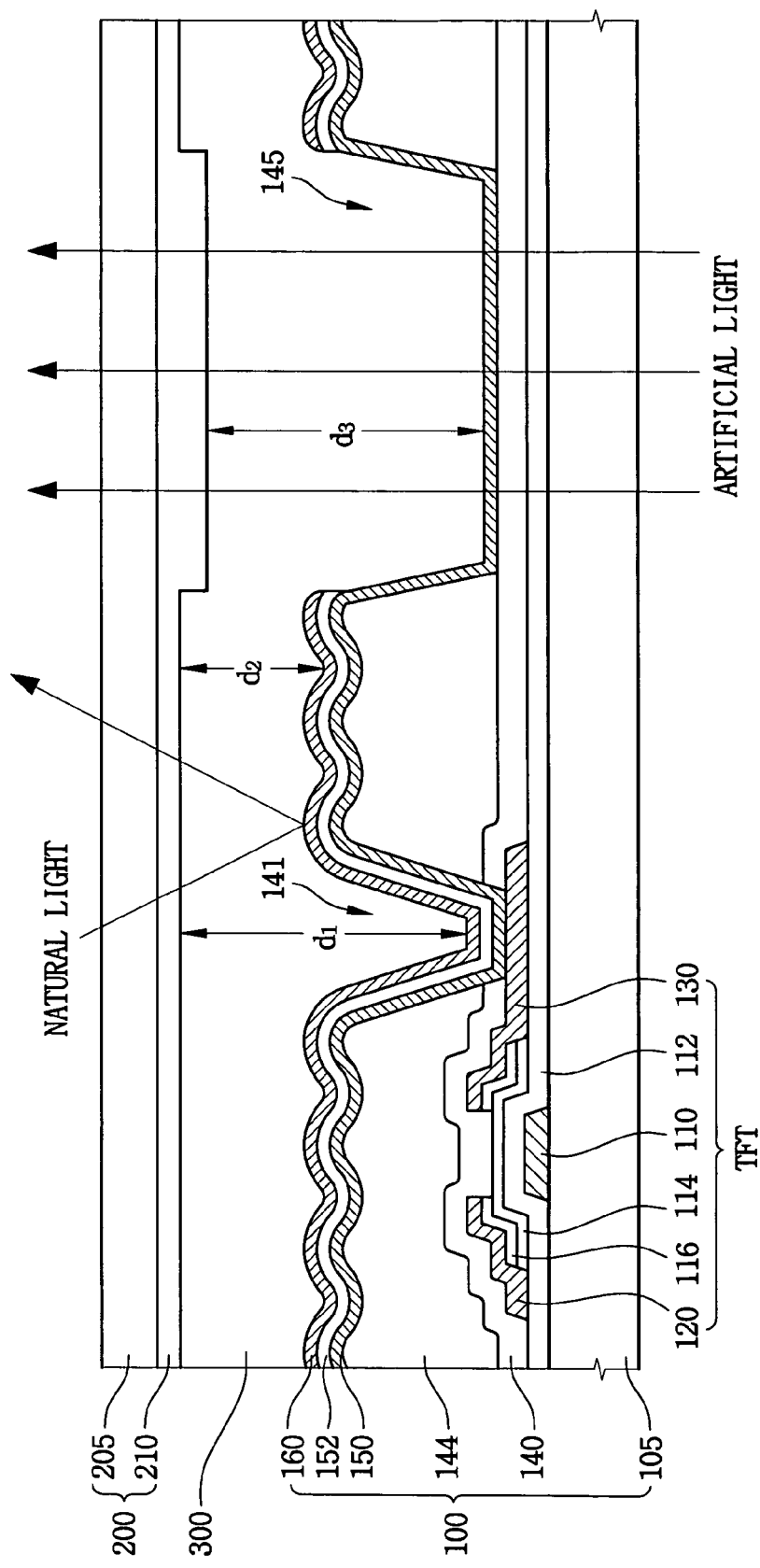
FIG. 3 depicts a cross-sectional view of a reflective-transmissive LCD device according to the first embodiment of the invention.

FIG. 3 shows a cross-sectional view of a reflective-transmissive LCD device, in accordance with the first embodiment of the invention. The reflective-transmissive LCD device includes an array substrate 100, a color filter substrate 200 and a liquid crystal layer 300 disposed in a liquid crystal cell formed between the array substrate 100 and the color filter substrate 200.

The array substrate 100 includes a switching element such as a thin film transistor (TFT) and an insulating layer 140. The switching element has a gate electrode 110 formed on a transparent substrate 105, a gate insulating layer 112 formed on the transparent substrate 105, a semiconductor layer 114, an ohmic contact layer 116, a source electrode 120 and a drain electrode 130. The insulating layer 140, which may be formed of an organic material, covers the switching element and exposes a portion of the drain electrode 130. A plurality of grooves and a plurality of protrusions may be formed on the insulating layer 140 to increase reflection efficiency.

The array substrate 100 further includes a pixel electrode 150, a protecting layer 152 and a reflecting plate 160. The pixel electrode 150 is formed on the organic insulating layer 140 and connected to the drain electrode through a first contact hole 141. The pixel electrode 150 is formed of a light-transmitting conductive material, such as indium tin oxide (ITO), tin oxide (TO) or indium zinc oxide (IZO). The protecting layer 152 is formed over the switching element. The reflecting plate 160 is formed on the protecting layer 152, and formed of an opaque metal having low resistance and high reflectivity such as aluminum. The area covered by the reflecting plate 160 constitutes a reflective region, and the area where an opening 145 is formed constitutes a transmissive region. Although it is not shown, a capacitor wire may be formed so as to define a storage capacitor (Cst) with the pixel electrode 150.

The color filter substrate 200 includes a black matrix layer (not shown) defining a red (R) pixel region, a green (G) pixel region and a blue (B) pixel region on a transparent substrate 205. A color filter layer 210 is formed on the pixel regions defined by the black matrix layer. A black matrix layer may be formed by superposition of the color filters. A surface protecting layer (not shown) may be formed to protect the black matrix layer and the color filter layer 210. Also, a common electrode layer (not shown) may be formed on the surface protecting layer. The common electrode layer can be formed in the array substrate 100.

The liquid crystal layer 300 is disposed in the liquid crystal cell formed between the array substrate 100 and the color filter substrate 200 and transmits a natural light from the color filter substrate 200 and an artificial light from the opening 145 depending on an electric field formed between the pixel electrode 150 and the common electrode layer. As shown in FIG. 3, the liquid crystal layer 300 has different cell gaps in the reflective region and the transmissive region. Also, a portion of the reflective region where the first contact hole 141 is formed has a different cell gap from the rest of the reflective region. The cell gaps of the liquid crystal layer 300 corresponding to the contact hole 141, the reflective region excluding the contact hole 141 and the opening 145 are represented by d1, d2 and d3, respectively. The d1, d2 and d3 are represented by the following expression.

$$d2 < d1 \leq d3 \quad \text{(Expression 1)}$$

Optical characteristics of the liquid crystal layer at the contact hole 141, the reflecting region excluding the contact hole 141, and the opening 145 are represented by "$\Delta nd1$", "$\Delta nd2$" and "$\Delta nd3$", respectively, where "$\Delta n$" is an anisotropy refractive index of the liquid crystal molecules and "d" is the cell gap thereof. The cell gaps may vary depending on the liquid crystal layer 300 and the optical films disposed on/under the liquid crystal layer 300. Preferably, d2 is equal to or less than 1.7 μm, and d3 is equal to or less than 3.3 μm.

Figure 4A:
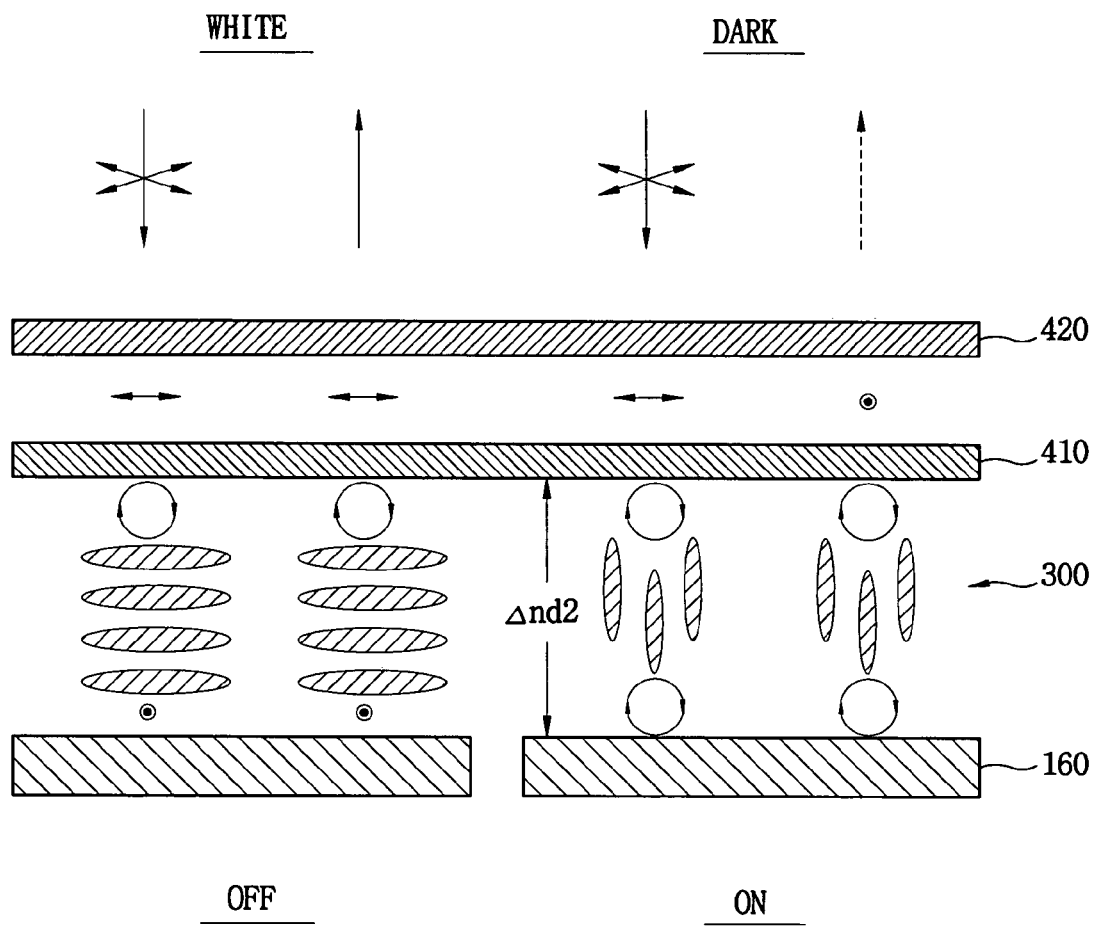
FIG. 4A depicts a reflective mode operation of the LCD device depicted in FIG. 3.
Figure 4B:
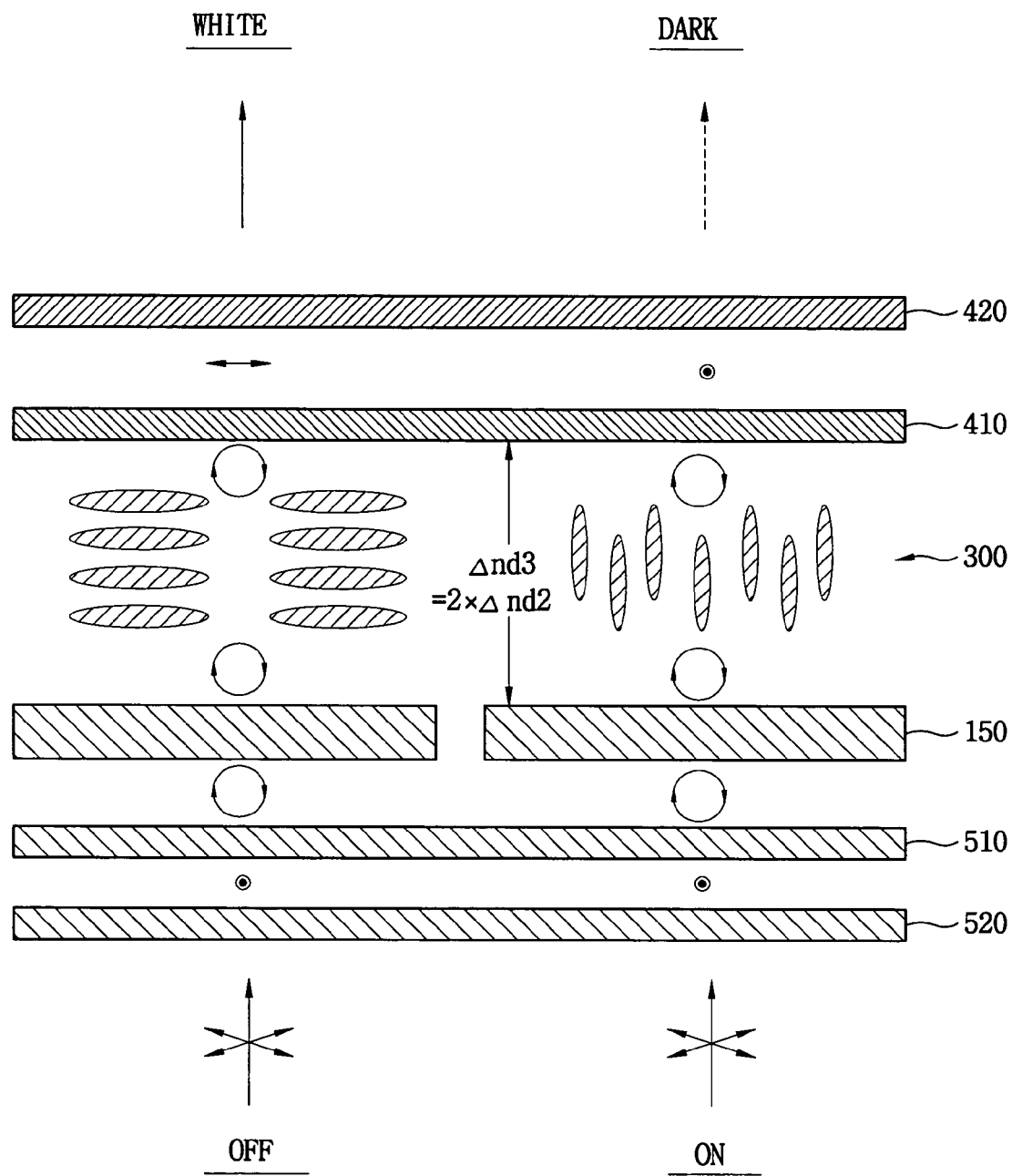
FIG. 4B depicts a transmissive mode operation of the LCD device depicted in FIG. 3.

FIGS. 4A and 4B illustrate operations of the reflective-transmissive LCD device shown in FIG. 3. FIG. 4A shows the "normally white" reflective mode operation where the liquid crystal molecules in the liquid crystal layer 300 are normally aligned substantially parallel to the transparent substrate 105. When no voltage is applied, a light externally provided to the LCD device passes through an upper polarizer 420 and linearly polarized. The light then passes through an upper λ/4 phase delay film 410 and circularly polarized. Because the liquid crystal molecules of the liquid crystal layer 300 are aligned substantially parallel to the transparent substrate 105, the light passing through the liquid crystal layer 300 is linearly polarized. The light is then reflected on the reflecting plate 160, passes through the liquid crystal layer 300 and circularly polarized. As mentioned above, the optical characteristics of the liquid crystal layer 300 corresponding to the reflective region is $\Delta nd2$. The light then passes through the upper λ/4 phase delay film 410 and is linearly polarized. The light then passes through the upper polarizer 420 and white is displayed from the LCD device.

When the voltage is applied to the liquid crystal, the liquid crystal molecules are aligned at an angle substantially perpendicular to transparent substrate 105. The light externally provided to the LCD device is linearly polarized when passing through the upper polarizer 420 and is. The light is then circularly polarized when passing through the upper λ/4 phase delay film 410. Because the liquid crystal molecules of the liquid crystal layer 300 are aligned substantially perpendicular to the array substrate, the light remains circularly polarized when passing through the liquid crystal layer 300. The light is then linearly polarized after passing through the upper λ/4 phase delay film 410 but shielded by the upper polarizer 420, thereby displaying black.

FIG. 4B shows the "normally white" transmissive mode operation where the liquid crystal molecules in the liquid crystal layer 300 are normally aligned substantially parallel to the transparent substrate 105. When no voltage is applied ("OFF"), the liquid crystal molecules in the liquid crystal layer 300 are aligned substantially perpendicular to the array substrate (not shown). An artificial light provided from the backlight assembly (not shown) passes through a lower polarizer 520 and is linearly polarized. The light is then circularly polarized when passing through a lower λ/4 phase delay film 510. After passing the pixel electrode 150, the light passes through the liquid crystal layer 300. Since the liquid crystal molecules are aligned substantially parallel to transparent substrate 105, the light passing through the liquid crystal layer 300 is circularly polarized. Optical characteristics of the liquid crystal layer 300 corresponding to the transmissive area is $\Delta nd3$, which is about two times larger than $\Delta nd2$. The light is then linearly polarized when passing through the upper λ/4 phase delay film 410. The light then passes through the polarizer 420 and white is displayed.

When the voltage is applied ("ON"), the liquid crystal molecules are aligned substantially perpendicular to the transparent substrate 105. The artificial light provided by the backlight assembly passes through the lower polarizer 520 and becomes linearly polarized. The light then circularly polarized when passing through the lower λ/4 phase delay film 510. The light then passes through the pixel electrode 150 and the liquid crystal layer 30 but remains circularly polarized because the liquid crystal molecules are aligned substantially perpendicular to the substrate 105. The light is then linearly polarized when passing through the upper λ/4 phase delay film 410 and shielded by he upper polarizer 420, thereby displaying black.

In this embodiment, the polarization is designed such that 100% of the light applied to the transmissive region are transmitted. However, the cell gap of the reflective region is decreased to equal to or less than 1.7 μm, thereby deteriorating high pixel. Also, the light may leak in a stepped portion between the reflection region and the transmissive region, thereby causing an afterimage problem. Further, the leaked light and the remaining birefringence of the liquid crystal deteriorate the contrast ratio.

Second Embodiment

Figure 5:
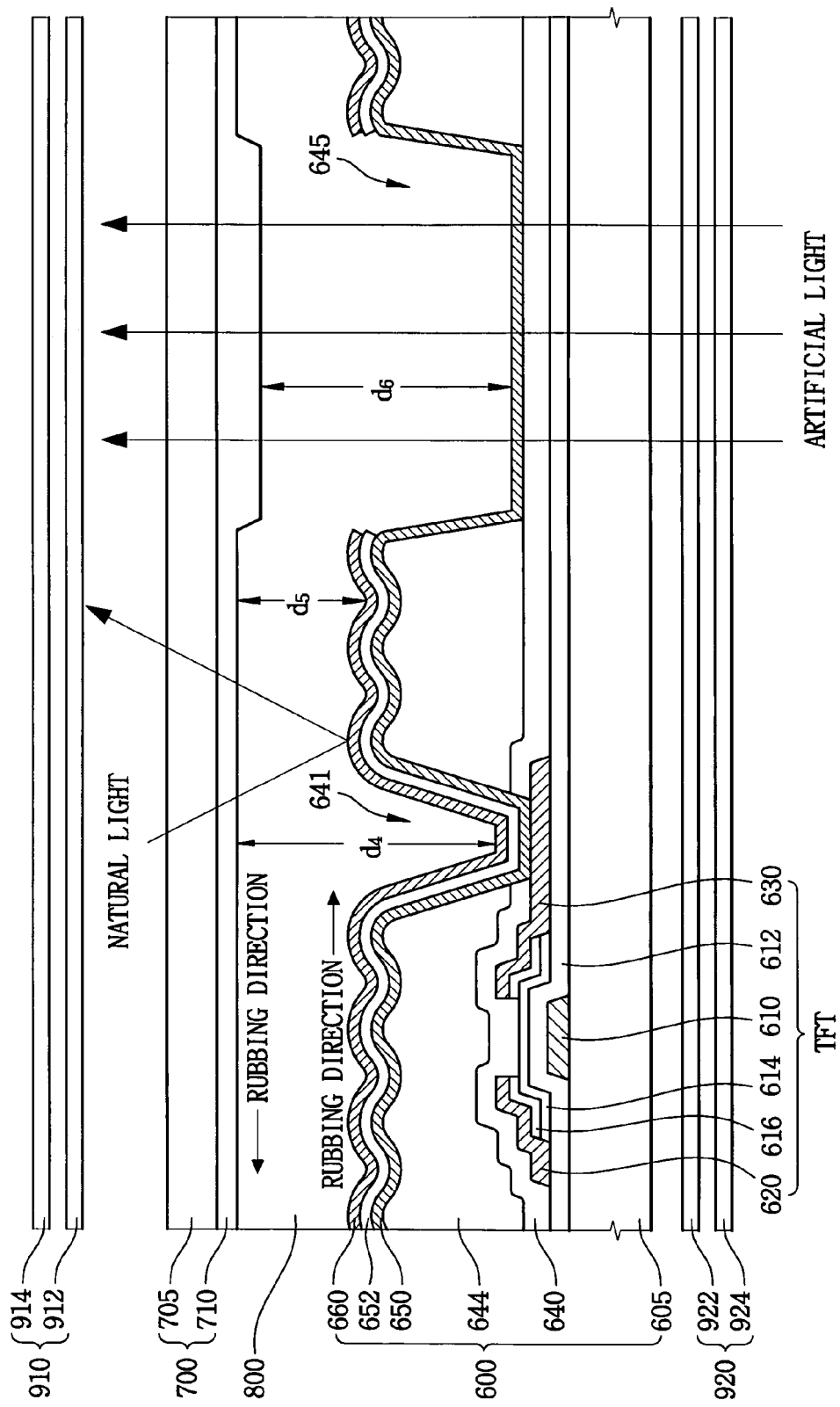
FIG. 5 depicts a cross-sectional view of a reflective-transmissive LCD device according to the second embodiment of the invention.

FIG. 5 shows a reflective-transmissive LCD device according to the second embodiment of the invention, of which the structure is similar to that of the first embodiment of the invention. The reflective-transmissive LCD device includes an array substrate 600, a color filter substrate 700, a liquid crystal layer 800 formed between the array substrate 600 and the color filter substrate 700, an upper optical film assembly 910 formed on the color filter substrate 700 and a lower optical film assembly 920 formed under the array substrate 600.

The array substrate 600 includes a switching element such as a thin film transistor (TFT) and an insulating layer 644. The switching element has a gate electrode 610 formed on a transparent substrate 605, a gate insulating layer 612 formed on the transparent substrate 605, a semiconductor layer 614, an ohmic contact layer 616, a source electrode 620 and a drain electrode 630. The insulating layer 644 covers the switching element and exposes a portion of the drain electrode 630. A plurality of grooves and protrusions are formed on the insulating layer 644 to increase reflection efficiency.

The array substrate 600 includes a pixel electrode 650, a protecting layer 652 and a reflecting plate 660. The pixel electrode 650 is formed on the insulating layer 640 and connected to the drain electrode 630 through a first contact hole 641. The protecting layer 652 is formed over the switching element. Here, a reflective region is covered by the reflecting plate 660, and a transmissive region is formed where an opening 645 is formed. The reflecting plate 660 is formed on the protecting layer 652 corresponding the reflecting region. The reflecting plate 660 is electrically separated from the pixel electrode 650 by the protecting layer 652. However, the reflecting plate 660 may be electrically connected to the pixel electrode 650 through an opening of the protecting layer 652.

The color filter substrate 700 includes a black matrix layer (not shown), a color filter layer 710 and a surface protecting layer (not shown).

The liquid crystal layer 800 is disposed in a liquid crystal cell formed between the array substrate 600 and the color filter substrate 700. The liquid crystal layer 800 has portion having different cell gaps. The cell gaps at the contact hole 641, the reflective region excluding the contact hole 641 and the transmissive region are represented by "d4", "d5" and "d6", respectively, which satisfy the following expression.

$$d5<d4\leq d6 \qquad \text{(Expression 2)}$$

Optical characteristics of the liquid crystal layer 800 at the contact hole 641, the reflecting region excluding the contact hole 641, and the transmissive window are represented by "Δnd4", "Δnd5" and "Δnd6", respectively, wherein "Δn" is an anisotropy refractive index of the liquid crystal, and "d" is a cell gap. The cell gaps vary depending on the liquid crystal layer 800 and the optical films disposed on/under the liquid crystal layer 800. In an embodiment of the invention, d5 is ranged between about 2.0 μm and about 2.5 μm, d6 is ranged between about 3.3 μm and about 5.0 μm.

In this embodiment, the liquid crystal molecules in the liquid crystal layer 800 are normally (i.e., when no voltage is applied) aligned at an angle equal to or greater than about 45°, preferably about 90°, with respect to the line parallel to the transparent substrate 605. The alignment angle of the liquid crystal molecules can be achieved by rubbing an alignment film (not shown) of the array substrate 600 in a first direction (i.e., to the right side) and rubbing an alignment film (not shown) of the color filter substrate 700 in a second direction opposite to the first direction (i.e., to the left side). Also, the desired alignment angle may also be formed rubbing the alignment film of the array substrate 600 in the second direction and rubbing the alignment film of the color filter substrate 700 in the first direction. The LCD device operates in a normally black mode.

The upper optical film assembly 910 includes an upper λ/4 phase delay film 912 formed on the color filter substrate 700 and an upper polarizer 914 formed on the upper λ/4 phase delay film 912. The upper optical film assembly 910 may change characteristics of a natural light or a reflected natural light. A phase plate for wider viewing angle is disposed between the upper λ/4 phase delay film 912 and the upper polarizer 914. The lower optical film assembly 920 includes a lower λ/4 phase delay film 922 formed under the array substrate 600 and a lower polarizer 924 formed under the lower λ/4 phase delay film 922. The lower optical film assembly 920 changes characteristics of an artificial light provided to the array substrate 600. A phase plate for wider viewing angle is disposed between the lower λ/4 phase delay film 922 and the lower polarizer 924. The pixel electrode 650 and the common electrode (not shown) are formed on the array substrate 600 and the color filter substrate 700, respectively. However, the common electrode may not be formed on the color filter substrate 700 if the LCD device operates in an in-plane switching (IPS) mode, a fringe field switching (FFS) mode or a co-planar electrode (CE) mode.

A portion of the color filter layer 710 corresponding to the reflective region may have a thickness different from that of portions corresponding to the transmissive region. Preferably, the portion of the color filter layer 710 corresponding to the reflective region is thinner than that of the portions corresponding to the transmissive region. However, the portions of the color filter layer 710 corresponding to the reflective region and the transmissive region may be substantially the same or different from each other. A plurality of holes may be formed in the portion of the color filter layer 710 corresponding to the reflective region to increase luminance of the light exiting from the reflecting region. The pixel electrode 650 may be formed on an organic insulating layer (i.e., top-ITO type) or under the organic insulating layer (i.e., bottom-ITO type). The liquid crystal layer 800 may have three different cell gaps in the top-ITO type because the cell gap d4 at the contact hole 641 is different from the cell gap d5 at the reflective region excluding the contact hole 641.

Figure 6A:
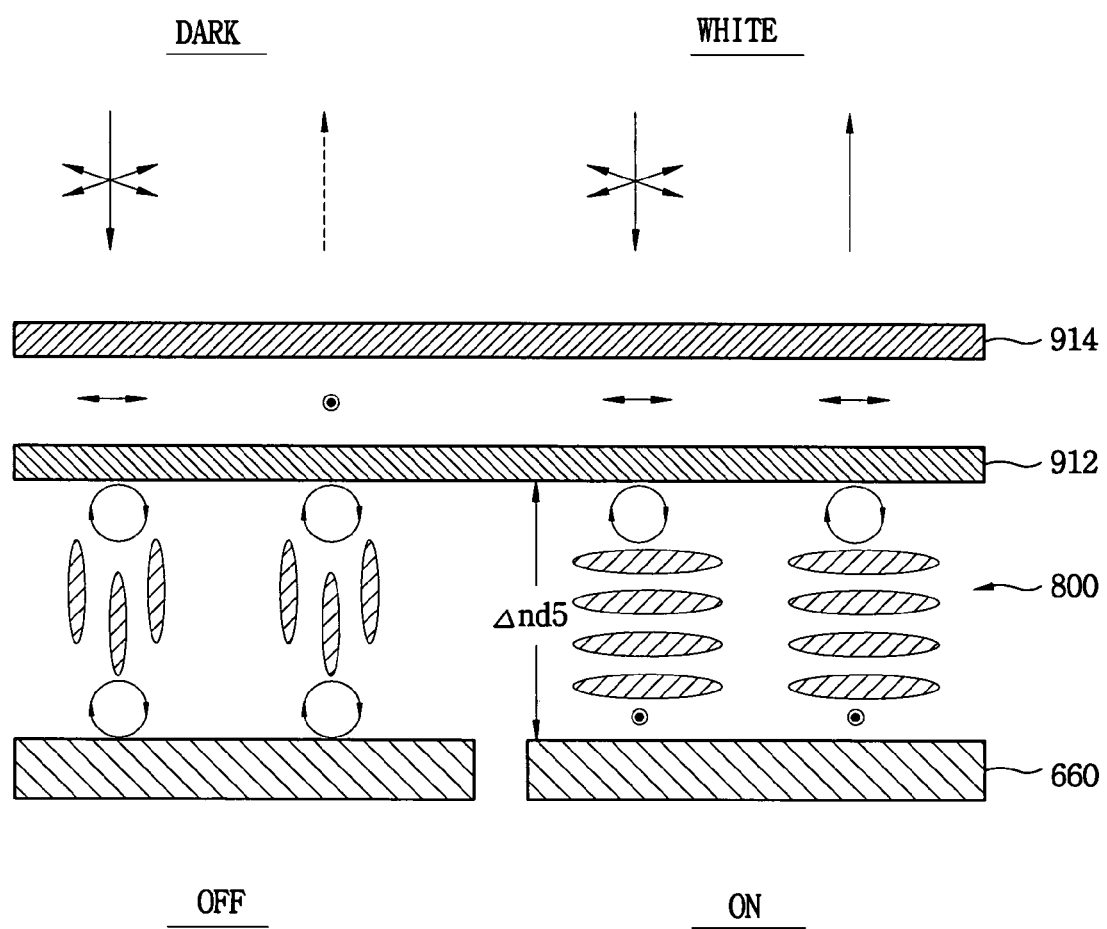
FIG. 6A depicts a reflective mode operation of the LCD device depicted in FIG. 5.
Figure 6B:
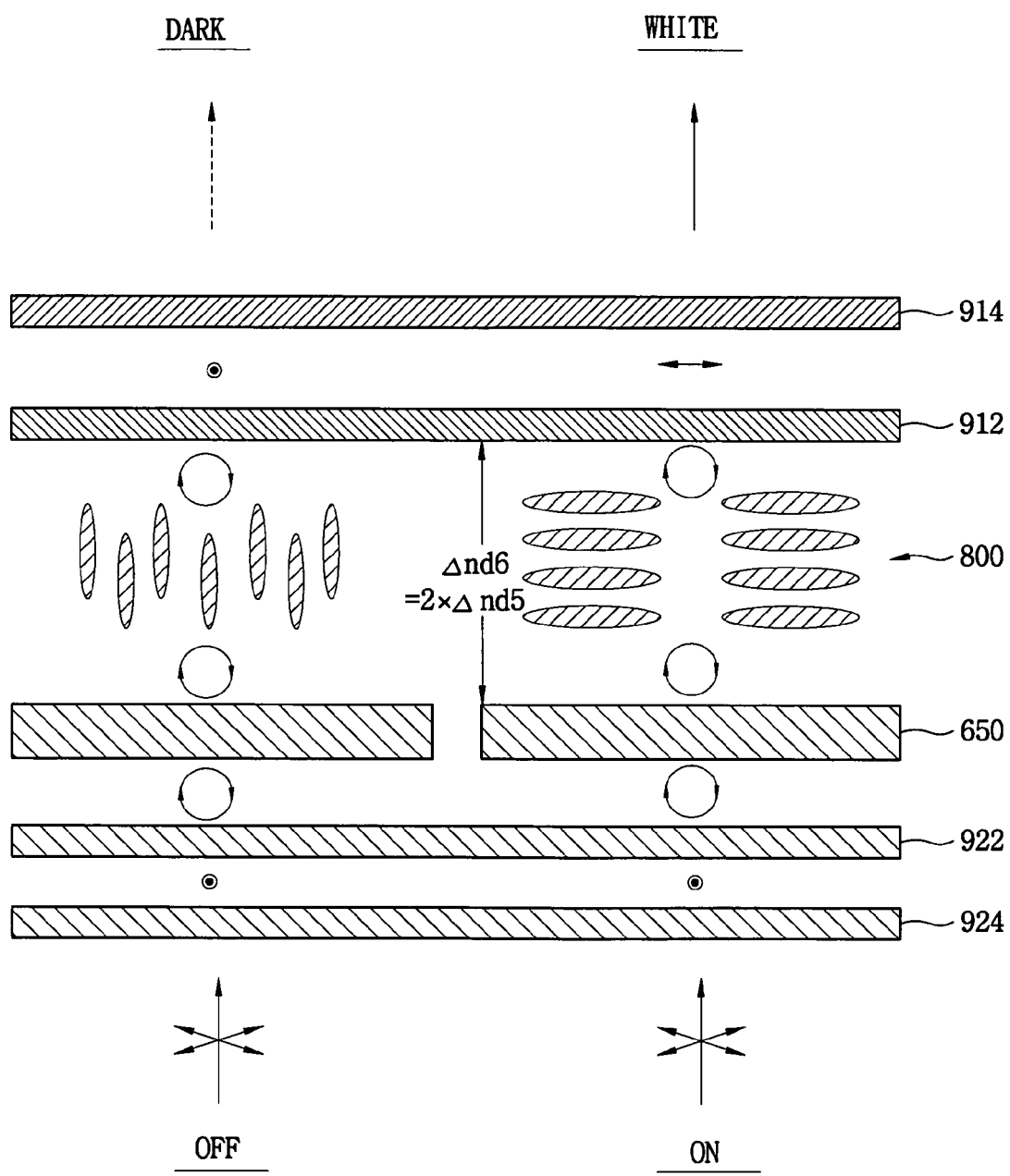
FIG. 6B depicts a transmissive mode operation of the LCD device depicted in FIG. 5.

FIGS. 6A and 6B show operations of the LCD device shown in FIG. 5, in which the liquid crystal molecules in the liquid crystal layer 800 are normally aligned at an angle substantially perpendicular to the substrate 605. FIG. 6A shows a reflective mode operation. When no voltage is applied ("OFF"), the light externally provided to the LCD device passes through the upper polarizer 914 and becomes linearly polarized. The light is then circularly polarized when passing through the upper λ/4 phase delay film 912. Because no voltage is applied, the liquid crystal molecules of the liquid crystal layer 800 are aligned at an angle substantially perpendicular to the substrate 605. The light directly passes through the liquid crystal layer 800 and linearly polarized when passing through the upper λ/4 phase delay film 912. The light is shielded by the upper polarizer 914 so as to display black (i.e., normally black").

When a voltage is applied ("ON"), a light externally provided to the LCD device passes through the upper polarizer 914 and is linearly polarized. The light is then circularly polarized when passing through an upper λ/4 phase delay film 912. The light passes through the liquid crystal layer 800, which changes the phase of the light by λ/4, and is linearly polarized. The light is reflected on the reflecting plate 660 and circularly polarized when passing through the liquid crystal layer 800. "Δnd5" is the optical characteristics of the liquid crystal layer 800 in the reflective mode. The light is linearly polarized when passing through the upper λ/4 phase delay film 912. The light then passes through the upper polarizer 914 and white is displayed.

FIG. 6B shows a transmitting mode operation. When no voltage is applied ("OFF"), the liquid crystal molecules in the liquid crystal layer 800 are aligned at an angle substantially perpendicular to the substrate 605. The artificial light from the backlight assembly (not shown) passes through the lower polarizer 924 and is linearly polarized. The light is then circularly polarized when passing through the lower λ/4 phase delay film 922. The circularly polarized light then passes through the pixel electrode 650 and the liquid crystal layer 800. The light is linearly polarized when passing through the liquid crystal layer 800. The linearly polarized light is shielded by the upper polarizer 914, and black is displayed.

When a voltage is applied ("ON"), the liquid crystal molecules in the liquid crystal layer 800 are aligned substantially parallel to the substrate 605. An artificial light from the backlight assembly (not shown) passes through the lower polarizer 924 and is linearly polarized. The light is circularly polarized when passing through the lower λ/4 phase delay film 922. The light then passes through the pixel electrode 650 and the liquid crystal layer 800. "Δnd6", which is the optical characteristics of the liquid crystal layer 800 in the transmitting mod, is about two times larger than Δnd5. The light passed through the liquid crystal layer 800 and the upper λ/4 phase delay film 912, thereby being linearly polarized. The light then passes through the upper polarizer 914 and white is displayed.

In the above embodiments, the λ/4 phase delay film is disposed between the liquid crystal layer and the polarizer. However, for wider viewing angle, a phase plate may be disposed on the upper λ/4 phase delay film or under the lower λ/4 phase delay film. The phase plate may include a first film having triacetyl cellulous (TAC), a second film having poly vinyl alcohol (PVA), a third film having triacetyl cellulous (TAC) and a discotic liquid crystal formed on the third film.

In the first embodiment, the LCD device, white is displayed when no voltage is applied and black is displayed when a voltage is applied ("normally white"). However, when a voltage of a high level is applied, a damaged high pixel, which cannot display white, is forced to display white. This is deteriorating display quality. In the second embodiment, the liquid crystal molecules normally aligned at an angle equal to or greater than about 45° with respect to the substrate is used and the LCD device operates in the normally black mode. Therefore, when a voltage of high level is applied, a damaged high pixel, which cannot display white, displays black. The black deteriorates display quality less than the white. Also, the reflective-transmissive LCD device operates in the normally black mode, the contrast rate is improved compared to the first embodiment. More specifically speaking, in the first embodiment, when a voltage is applied, the liquid crystal molecules are aligned substantially perpendicular to the substrate and black is displayed. However, the liquid crystal molecules in a peripheral region of the pixel may not be aligned substantially perpendicular and black may not be displayed. Contrarily, in the second embodiment, the liquid crystal molecules in the peripheral region are normally aligned vertically when no voltage is applied, thereby displaying black. Thus, the contrast ratio is improved.

Also, in the first embodiment, the cell gaps of the reflective region and the transmissive region are about 1.6 μm and about 3.3 μm, respectively. However, in the second embodiment, the cell gaps in the reflective region and the transmissive region are about 2.2 μm and about 4.2 μm, respectively. The increased cell-gaps prevent short, which may be formed by particles. Further, the light leakage and after image problems in the stepped region described in the first embodiment may be prevented. In the first embodiment, the LCD operates in the normally white mode which leaks the light and shades an image. However, in the second embodiment, the LCD operates in a normally black mode, thereby preventing the light leakage and the afterimage from occurring at the stepped region. Furthermore, in the first embodiment, the viewing angle is about 40° and the viewing angle of the second embodiment is about 70 degree by using the phase plate.

Third Embodiment

Figure 7:
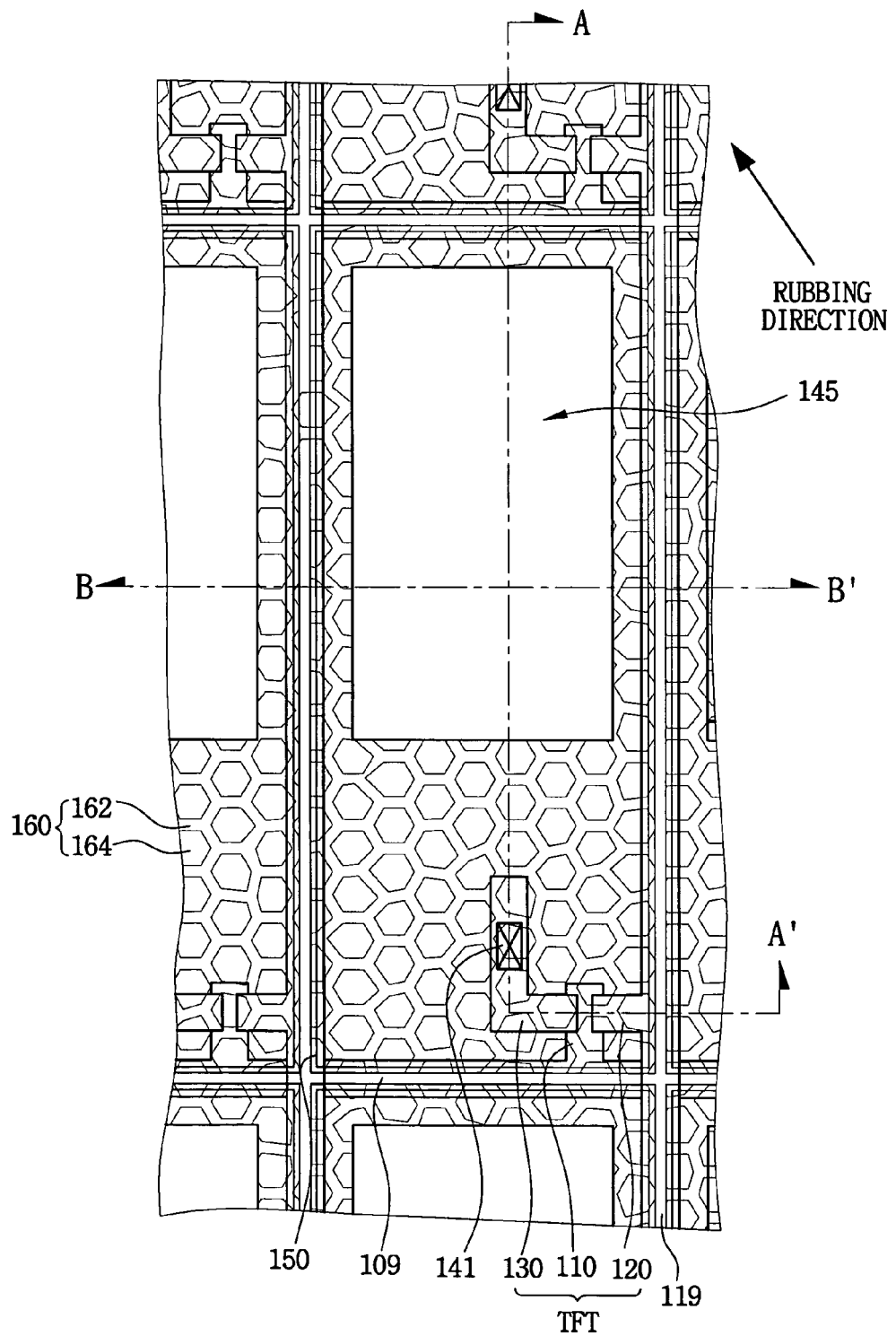
FIG. 7 depicts a top view of the LCD device depicted in FIG. 3.

FIG. 7 shows a top view of the reflective-transmissive LCD of the first embodiment. The switching element is formed in one of areas defined by a plurality of gate lines 109 and a plurality of source lines 119 adjacent to each other. The switching element has a gate electrode 110 connected to the gate line 109, the source electrode 120 connected to the source line 119 and a drain electrode 130 separated from the source electrode 120. The gate lines 109 formed on a transparent substrate are vertically arranged and horizontally extended. The source lines 119 formed on the transparent substrate are horizontally arranged and vertically extend. The crossing of the gate lines 109 and the source lines 119 defines a plurality of pixel regions. In a pixel region, the pixel electrode 150 is connected to the drain electrode 130. The reflecting plate 160 the opening 145 define the reflective region and the transmissive region, respectively, of the pixel region. Preferably, the reflecting plate 160 has a plurality of grooves 162 and a plurality of protrusions 164. A rubbing direction of the pixel region may form an angle of about 60 degree in a counterclockwise with respect to the source line 119.

Figure 8A:
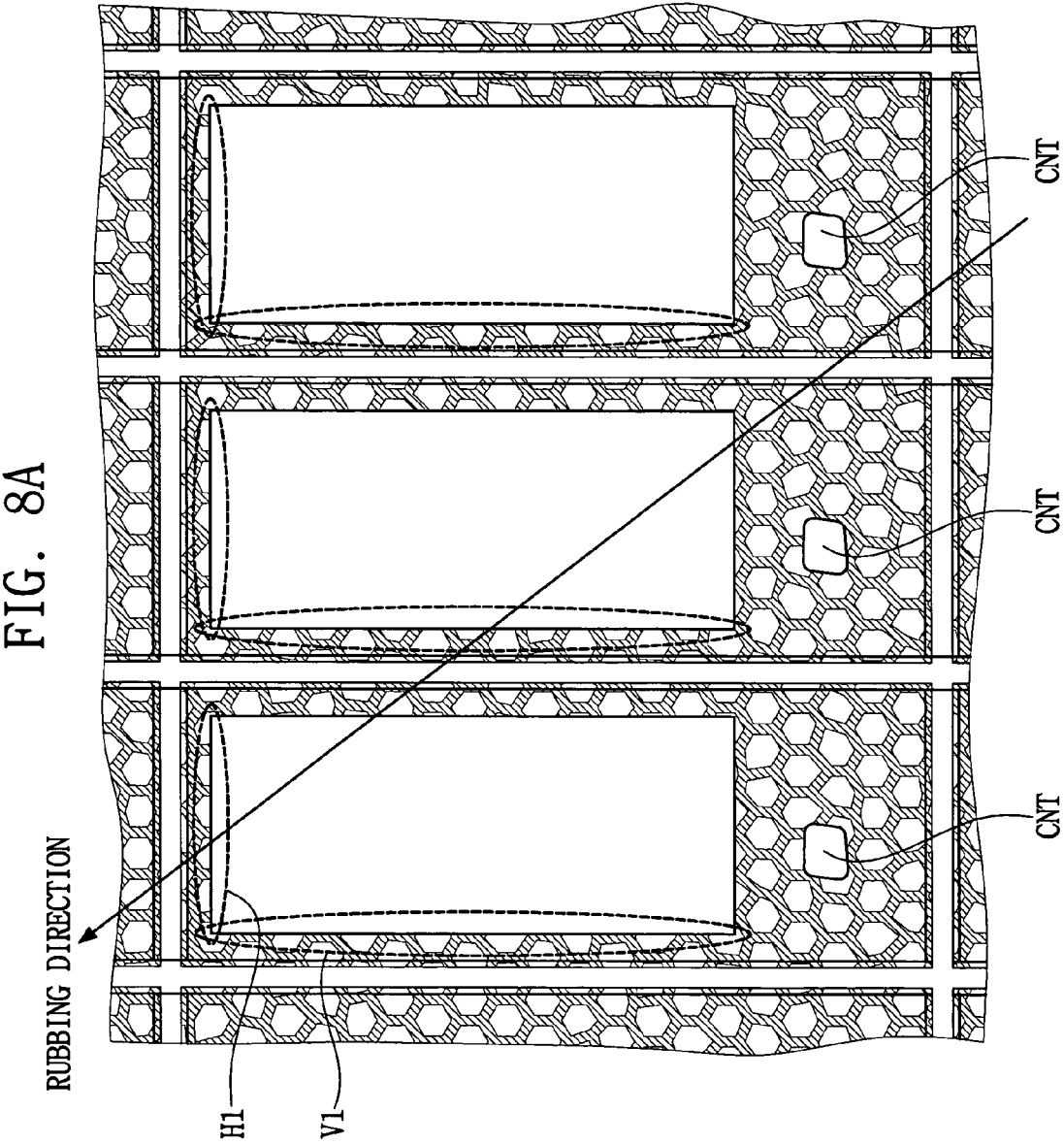
FIG. 8A depicts an afterimage problem of the LCD device depicted in FIG. 7.

FIGS. 8A and 8B show simplified top views of the LCD device of FIG. 7 to explain the light leakage and afterimage problems of the first embodiment. A contact hole formed on the drain electrode is represented by "CNT". In FIG. 8A, when a rubbing direction forms an angle of about 60° counterclockwise with respect to the source line 119, afterimage is formed by light leakage in the dotted portions adjacent to two lines H1, V1 of the opening. In FIG. 8B, when a rubbing direction forms an angle of about 60° counterclockwise with respect to the source line 119, light leakage is also formed in the dotted portions adjacent to four lines H1, H2, V1, V2 of the opening.

Figure 9B:
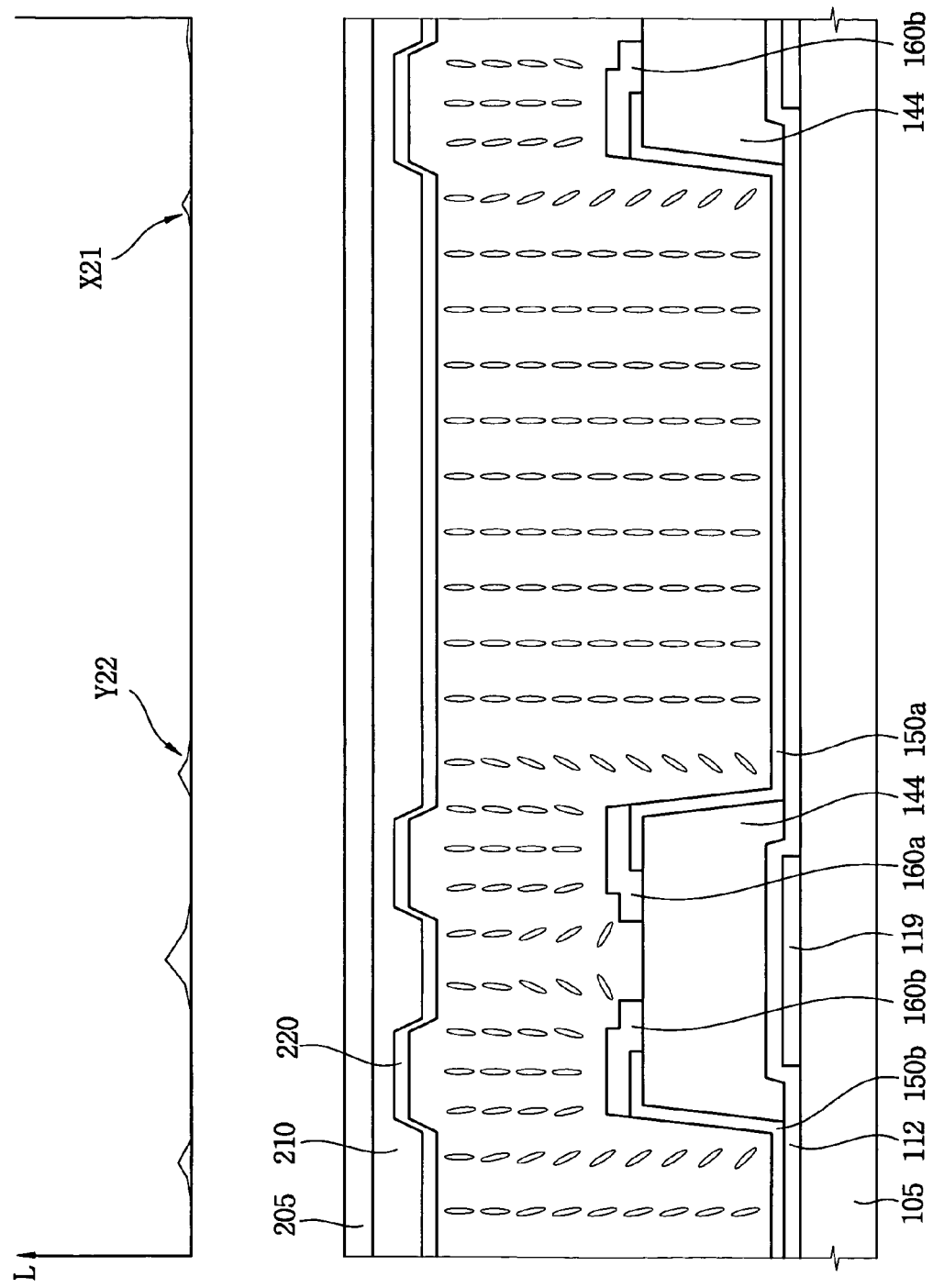
FIG. 9B depicts the cross-sectional view of FIG. 7 and the light leakage observed 200 ms after a voltage is applied.

FIG. 9A shows a cross-sectional view of the LCD device cut along the line B-B' shown in FIG. 7 and the light leakage and afterimage observed 20 ms after a voltage has been applied. The liquid crystal molecules at the reflective region and the central region of the transmissive region are aligned vertically. The liquid crystal molecules at the edges of the opening are vertically aligned. The light leakage X11 occurs at the right edge of the opening. The afterimage Y11 occurs at the left edge of the opening. The afterimage Y11 is more intense than the light leakage X11. FIG. 9B shows the light leakage and afterimage of FIG. 9A observed 200 ms after the voltage has been applied. The light leakage X21 occurs at the right edge of the opening. The afterimage disappears from the left edge of the opening, but the light leakage Y22 occurs at the left edge of the opening. In other words, when a predetermined time has passed after the voltage being applied, the afterimage may disappear but the light leakage may remain because the afterimage is formed at the beginning of a frame by a voltage applied in the previous frame but the light leakage is formed during frames.

Figure 10:
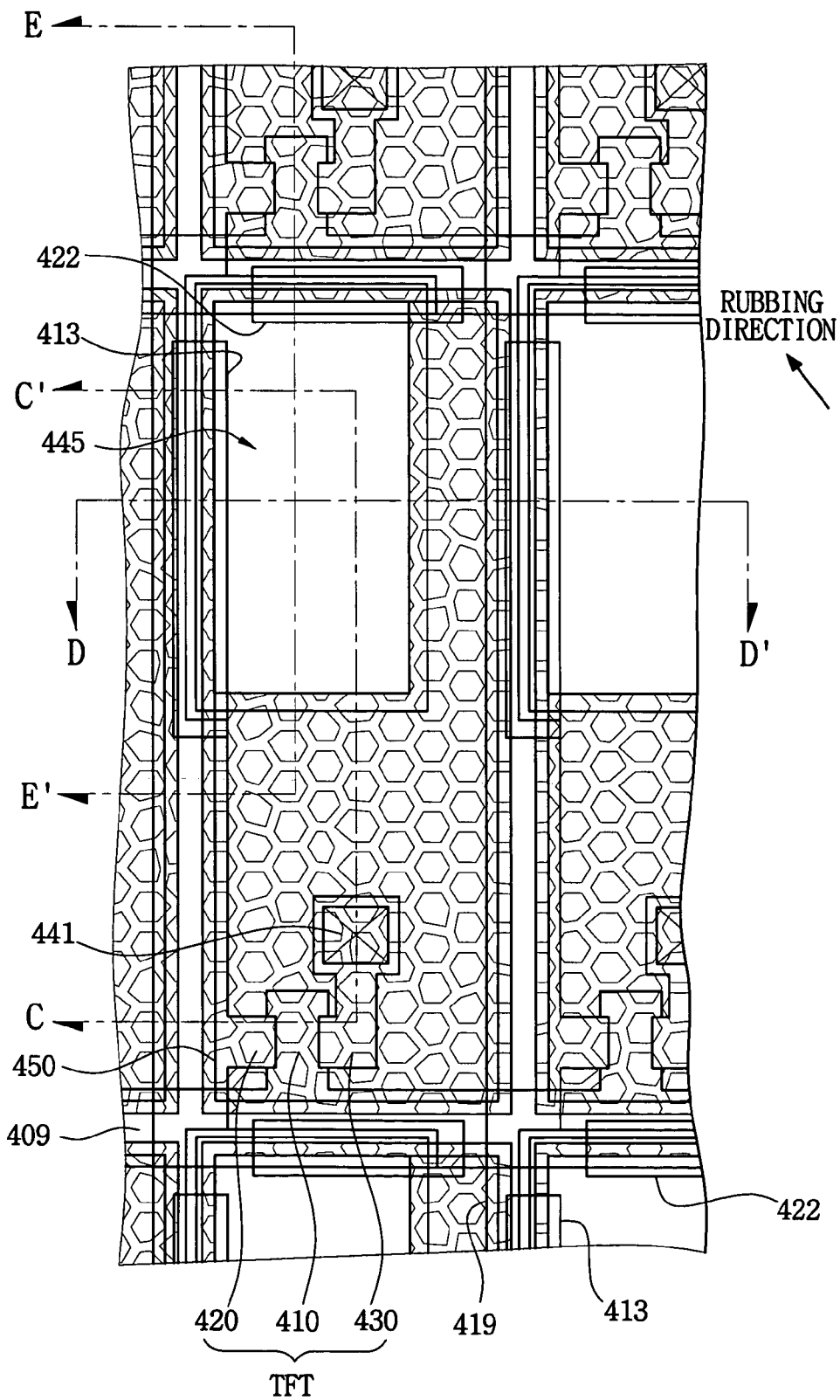
FIG. 10 depicts a top view of a reflective-transmissive LCD device according to the third embodiment of the invention.

FIG. 10 show a top view of a reflective-transmissive LCD device according to the third embodiment of the invention. The LCD device includes a plurality of gate lines 409, a plurality of source lines 419, first light barrier patterns 413, second light barrier patterns 422, a switching element such as a TFT, a pixel electrode 450, a reflecting plate 460 formed on the pixel electrode 450 and an opening 445. The gate lines 409 formed on a substrate are vertically arranged and horizontally extended. The source lines 419 formed on the substrate are horizontally arranged and vertically extended. The pixel electrode 450 formed on a passivation layer is connected to the drain electrode 430 through a contact hole 441. Alternatively, the pixel electrode 450 can be formed under the passivation layer. The crossing of the gate lines 409 and the source lines 419 defines a plurality of pixel regions. In the pixel region, the reflecting plate 460 defines the reflective region and the opening 445 defines the transmissive region.

In this embodiment, when a rubbing direction of an alignment film (not shown) forms an angle of about 60 degree counterclockwise with respect to the source line 419, the opening 445 is formed closer to the upper left corner of the pixel. In other words, the opening 445 is formed closer to a corner to which the direction from the center of the pixel substantially coincides with the rubbing direction of the pixel to minimize the light leakage and afterimage problems, thereby improving display qualities. The first light barrier patterns 413 are formed to prevent the light leakage and afterimage, which may be formed at the left edge of the opening 445 in a pixel. The first light barrier patterns 413 are arranged horizontally and extended vertically and may be formed with the gate lines 409. Each first light barrier pattern 413 has a floating pattern and is superposed on the source line 419. The second light barrier patterns 422 are formed to prevent the light leakage and afterimage, which may be formed at the upper edge of the opening 445. The second light barrier patterns 422 may be formed with the source lines 419, and are arranged vertically and extended horizontally. Each second light barrier pattern 422 also has a floating pattern and is superposed on the gate line 409.

Figure 11A:
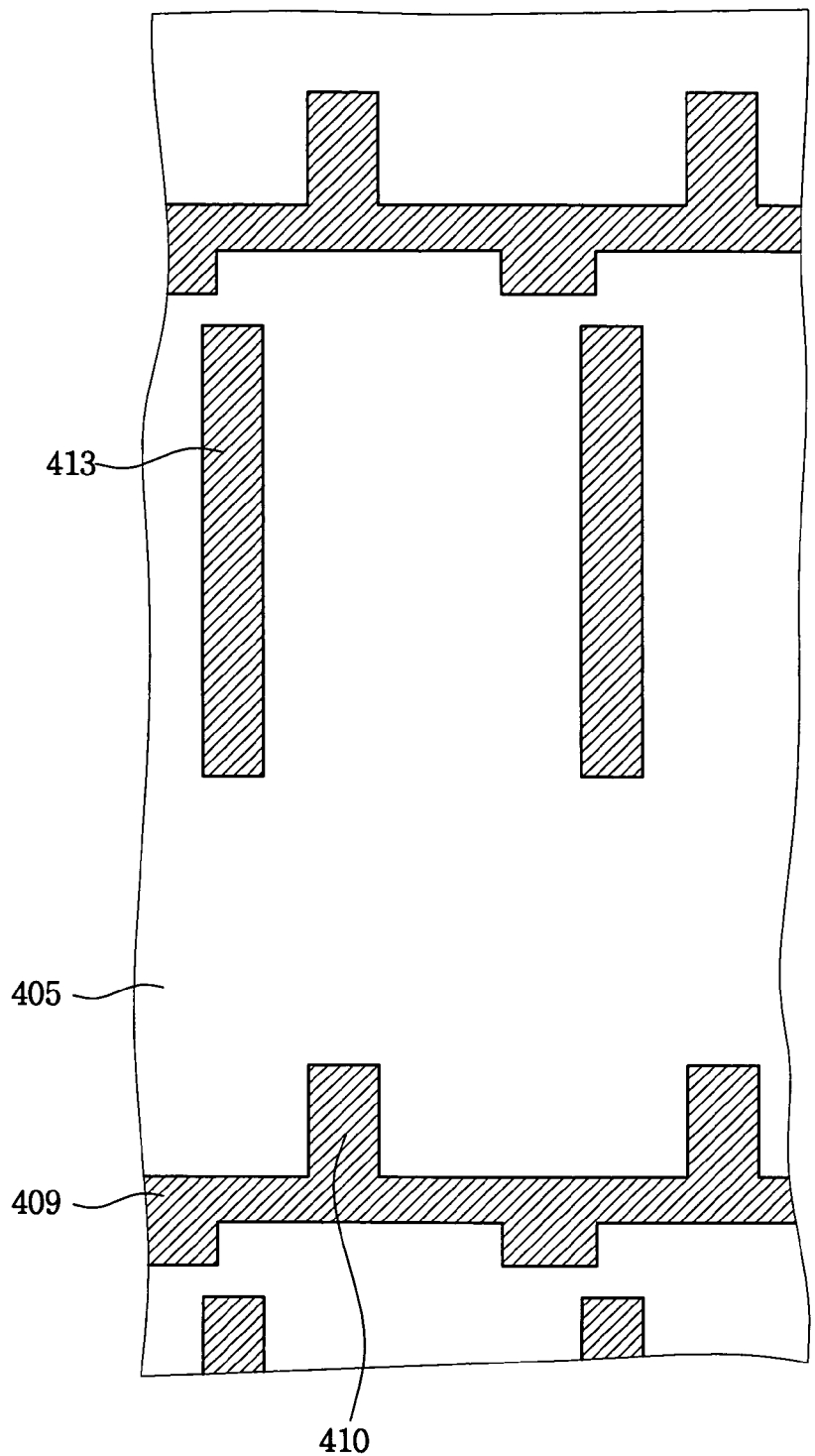
FIGS. 11A-11E depict the processing steps for forming the LCD device depicted in FIG. 10.

FIGS. 11A to 11E depict a method of manufacturing the reflective-transmissive LCD device shown in FIG. 8. In FIG. 11A, a metal such as tantalum (Ta), titanium (Ti), molybdenum (Mo), aluminum (Al), chrome (Cr), copper (Cu) or tungsten (W) is deposited on the insulating substrate such as glass or ceramics. The metal is then patterned to form the lines 409, a gate electrode 410 and the first light barrier patterns 413. The gate lines 409 are arranged and vertically extended horizontally. The first light barrier patterns 413, which are floating patterns, are horizontally arranged and extended vertically. The storage capacitor line may be also formed with the gate electrode 410. Although not shown, a gate insulating layer is formed over the substrate having gate electrode 410, for example, by depositing silicon nitride using plasma chemical vapor deposition. An amorphous silicon layer and an n+amorphous silicon layer are deposited on the gate insulating layer in situ and patterned to form a semiconductor layer and an ohmic contact layer on a portion of the gate insulating layer corresponding to the gate electrode 410.

Figure 11B:
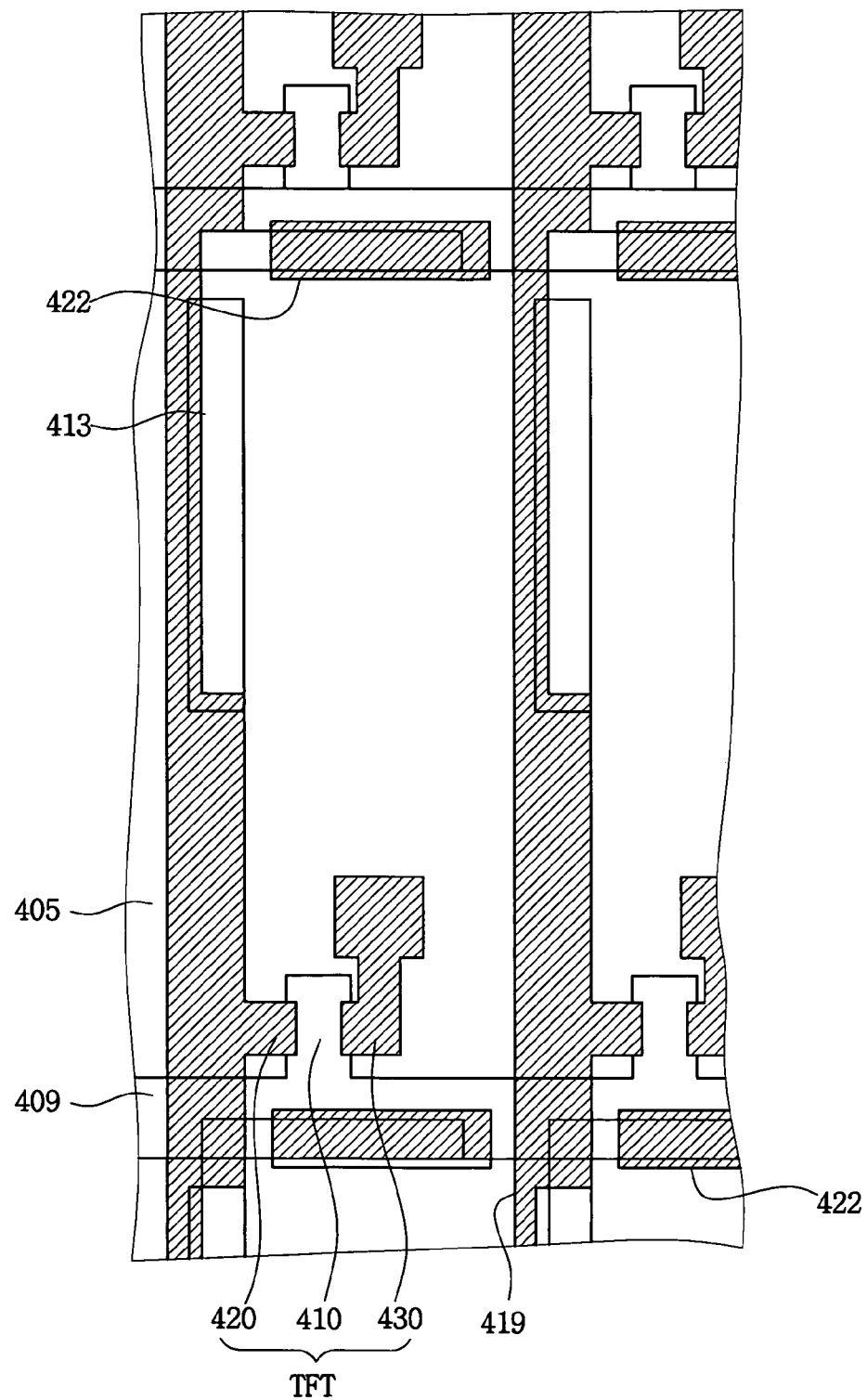

Referring to FIG. 11B, a metal such as tantalum (Ta), titanium (Ti), molybdenum (Mo), aluminum (Al), chrome (Cr), copper (Cu) or tungsten (W) is deposited over the substrate. The metal is then patterned to form the source lines 419, the source electrode 420, the drain electrode 430 and the second light barrier patterns 422. The source lines 419 are arranged horizontally and extended vertically. The second light barrier patterns 422 are arranged vertically, extended horizontally and have floating patterns.

Preferably, a portion of the gate line 409 adjoining the second light barrier pattern 422 is formed to be narrower than other portions of the gate line 409 in order to reduce the overlapping area between the gate line 409 and the second light barrier pattern 422. Also, a portion of the source line 419 adjoining the first light barrier pattern 413 is formed to be narrower than other portions of the source line 419 in order to reduce the overlapping area between the source line 419 and the first light barrier pattern 413. However, it is not necessary to form the portions of the gate lines 409 and the source lines 419 narrower.

Figure 11C:
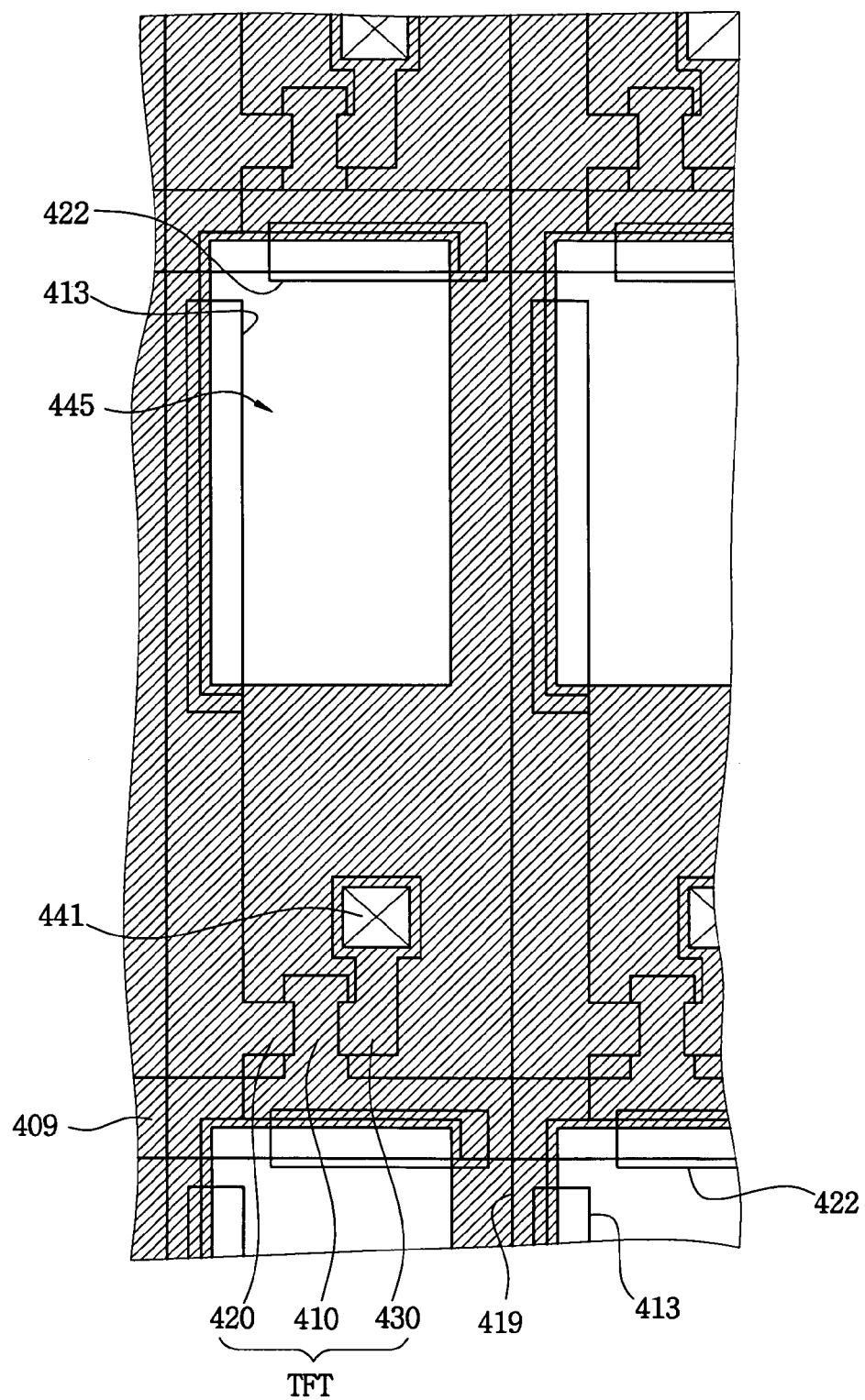
Figure 11D:
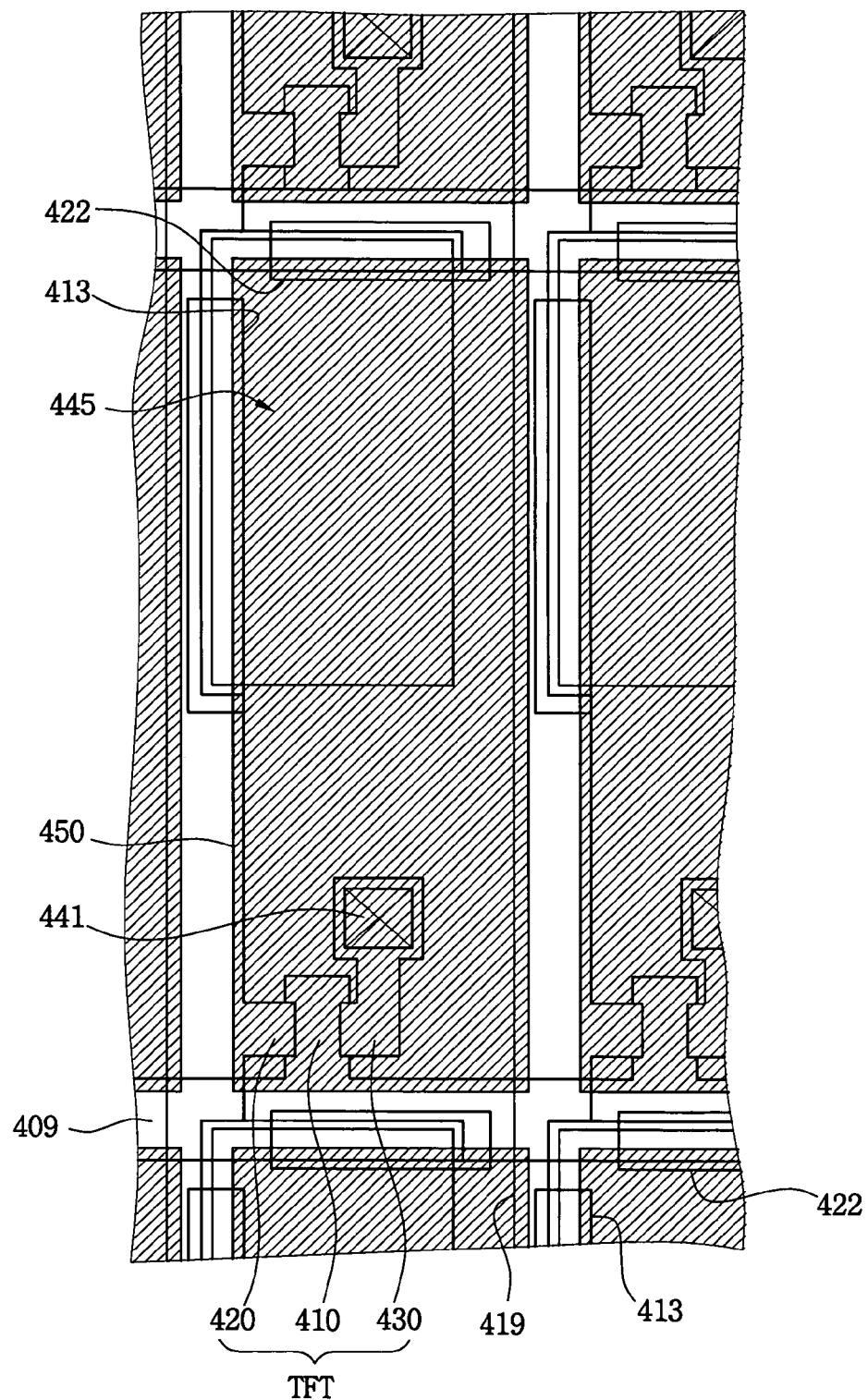
Figure 11E:
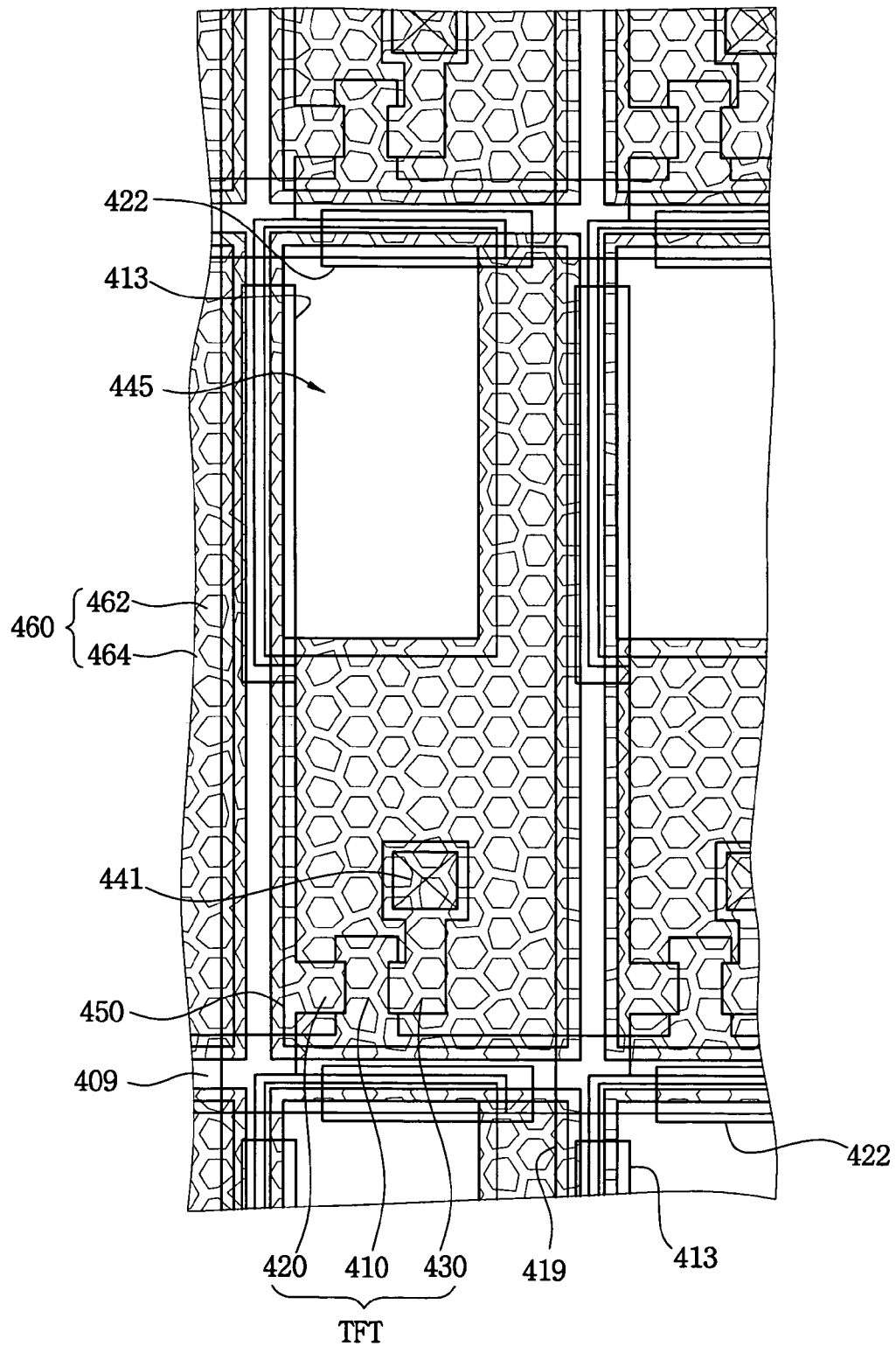

In FIG. 11C, an insulating layer is formed over the substrate, for example, by a spin coating method to form a thick organic insulating layer. The portions corresponding to the transmissive region and the drain electrode 430 are then removed to form the opening 445 and the contact hole 441, respectively. The opening 445 exposes a portion of the first light barrier pattern and a portion of the second light barrier pattern. In FIG. 11D, an ITO layer is formed over the insulating layer to form the pixel electrode 450. The pixel electrode 450 is connected to the drain electrode 430 through the contact hole 441. In FIG. 11E, the reflecting plate 460 is formed on the pixel. The reflecting plate 460 may have a plurality of grooves 462 and protrusions 464 to increase reflection efficiency. The reflecting plate 460 may be extended to cover the edge of the opening 445 to prevent the light leakage and afterimage problems. FIG. 11E shows the reflecting plate 460 extending to cover four edges of the opening 445.

Figure 12:
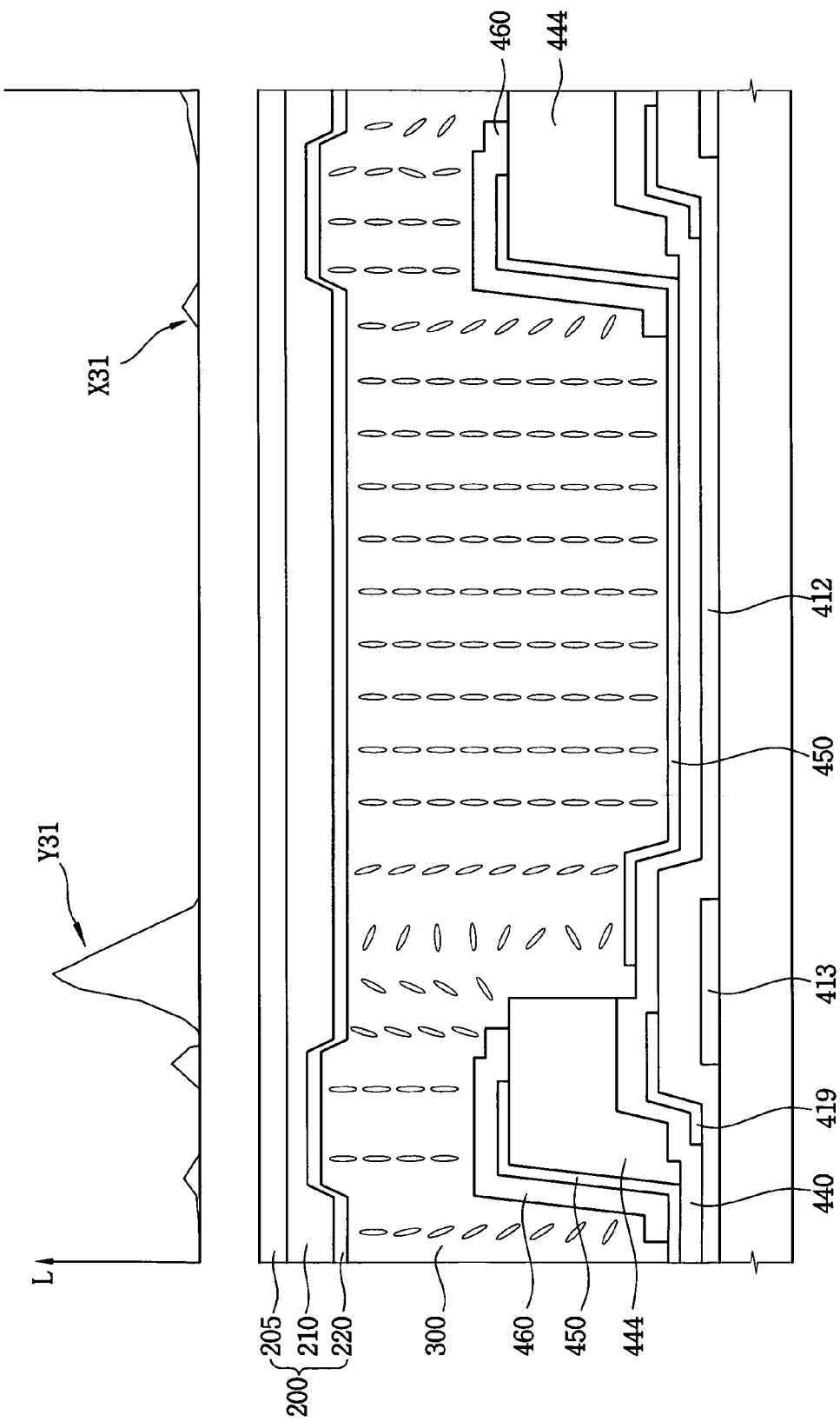
FIG. 12 depicts a cross-sectional view cut along the line D-D' of the LCD device depicted in FIG. 10 and the light leakage and the after image observed 20 ms after a voltage is applied.
Figure 13:
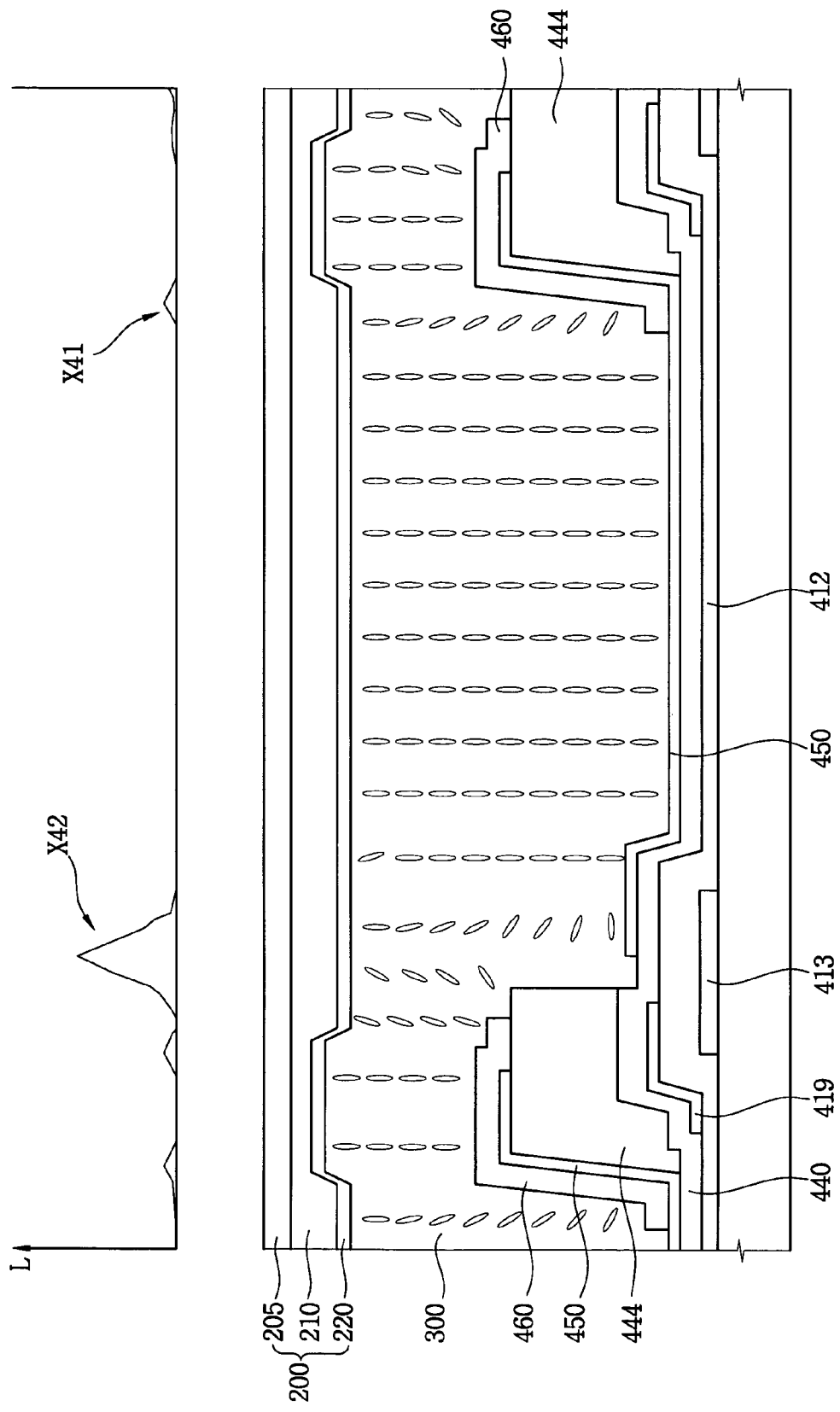
FIG. 13 depicts the cross-sectional view of FIG. 12 and the light leakage observed 200 ms after the voltage is applied.

FIG. 12 shows a cross-sectional view of the LCD device cut along the line C-C' shown in FIG. 10 and the light leakage and the afterimage observed 20 ms after a voltage is applied. As shown therein, the liquid crystal molecules at the edge of the opening that are not vertically aligned cause the light leakage and afterimage problems. That is, the light leakage X31 occurs at the right edge of the opening, and the afterimage Y31 occurs at the left edge of the opening because the liquid crystal molecules are affected by the irregular fringe field occurring at the stepped region between the reflective region and the transmissive region. However, in this embodiment, the reflecting plate 460 is extended to cover the right edge of the opening to prevent the light leakage X31, and the first light barrier pattern 413 formed at the left edge of the opening prevents the afterimage Y31. FIG. 13 shows a cross-sectional view of the LCD device cut along D-D' line shown in FIG. 10 and the light leakage and afterimage observed 200 ms after the voltage is applied. As shown therein, the light leakage X41 occurs at the right edge of the opening and the light leakage X42 occurs at the left edge of the opening. The light leakage X42 is more intense than the light X41. However, the reflecting plate 460 is extended to prevent the light leakage X41 in the right edge of the opening and the first light barrier pattern 413 prevents the light leakage X42 in the left edge of the opening.

Figure 14:
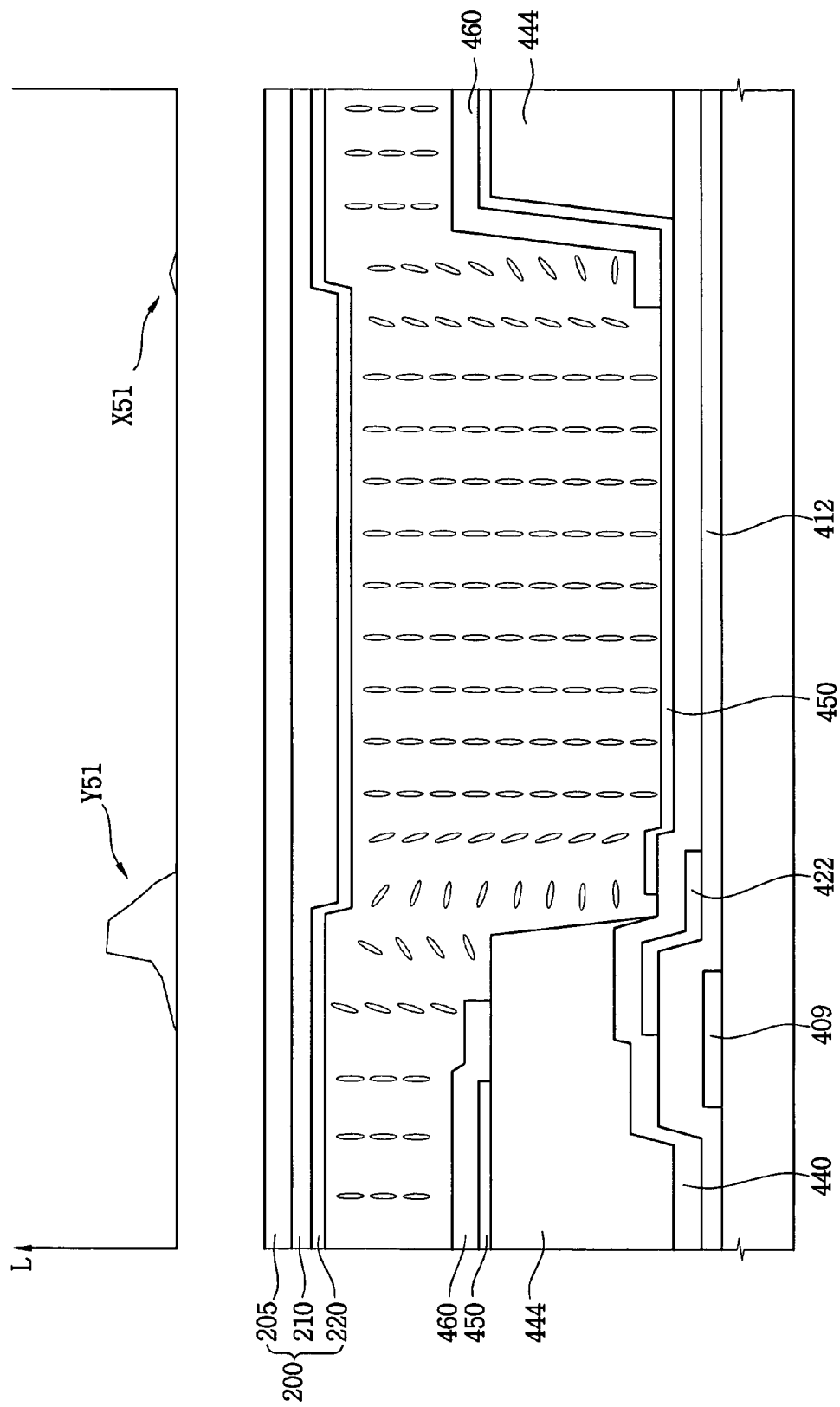
FIG. 14 depicts a cross-sectional view cut along the line E-E' of the LCD device depicted in FIG. 10 and the light leakage and the after image observed 20 ms after a voltage is applied.
Figure 15:
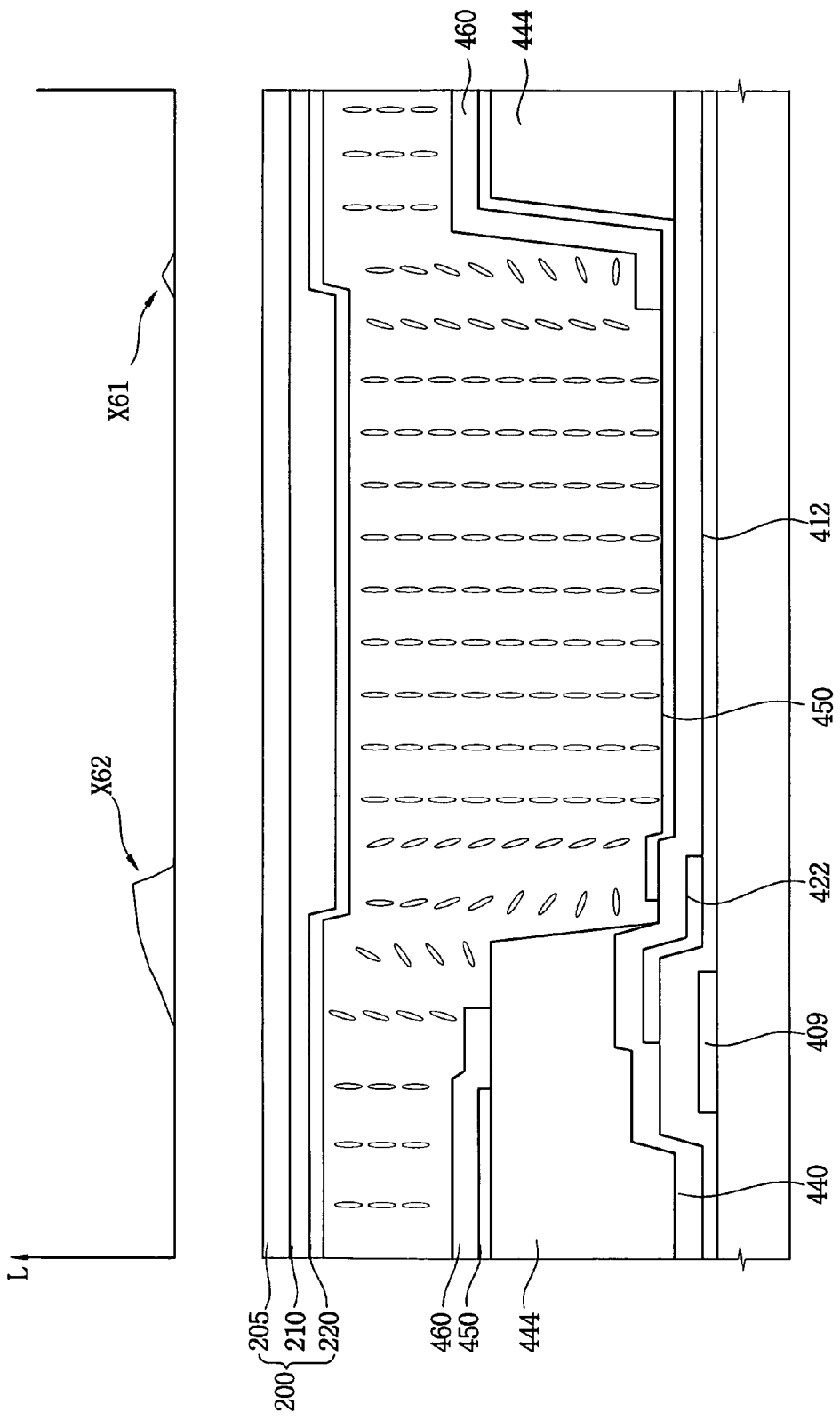
FIG. 15 depicts the cross-sectional view of FIG. 13 and the light leakage observed 200 ms after the voltage is applied.

FIG. 14 shows a cross-sectional view of the LCD device cut along E-E' line shown in FIG. 8 and the light leakage and afterimage observed 20 ms after a voltage is applied. The light leakage X51 occurs at the right edge of the opening and the afterimage Y51 occurs at the left edge of the opening. However, the light leakage X51 is prevented by the reflecting plate 460 extending to cover the right edge of the opening, and the after image Y51 is prevented by the second light barrier pattern 422. FIG. 15 shows a cross-sectional view of the LCD device cut along the line E-E' and the light leakage occurred 200 ms after the voltage is applied. The light leakage X61 occurs at the right edge of the opening and the light leakage X62 occurs at the left edge of the opening. The light leakage X62 is more intense that the light leakage X61. In this embodiment, the light leakage X61 is prevented by the reflecting plate 460 extended to cover the right edge of the opening, and the light leakage X62 is prevented by the second light barrier pattern 422 overlapping the left edge of the opening.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A liquid crystal display (LCD) device, comprising:
a first substrate; a second substrate facing the first substrate; a liquid crystal cell formed between the first substrate and the second substrate; a liquid crystal layer disposed in the liquid crystal cell; a first area having a reflective electrode and having a first cell gap; a second area having an exposed portion of a transparent electrode, which is not overlapped with the reflective electrode, and having a second cell gap greater than the first cell gap; and a color filter formed on the second substrate, wherein a first portion of the color filter corresponding to the second area is thicker than a second portion of the color filter corresponding to the first area so that a portion of the second substrate having the color filter protrudes toward the first substrate in the second area, wherein the liquid crystal layer comprises liquid crystal molecules normally aligned at an angle equal to or greater than about 45° with respect to a line parallel to the first substrate, and wherein the second area is formed closer to a first corner of the pixel region than each remaining corner of the pixel region, and at least a portion of the second area overlaps a gate line or a data line, the gate line and the data line being formed on the first substrate to be connected to a switching element.

2. The LCD device of claim 1, wherein the liquid crystal molecules are normally aligned at an angle of about 90° with respect to the line parallel to the first substrate.

3. The LCD device of claim 1, wherein the LCD device displays black is normally black.

4. The LCD device of claim 1, further comprising:
a first polarizer formed on the first substrate; and
a second polarizer formed under the second substrate.

5. The LCD device of claim 4, wherein the first polarizer has a polarization direction substantially perpendicular to that of the second polarizer.

6. The LCD of claim 4, further comprising:
a first phase delay film formed between the first polarizer and the first substrate; and
a second phase delay film formed between the second polarizer and the second substrate.

7. The LCD of claim 6, wherein the first phase delay and the second phase delay film delay are a $\lambda/4$ phase delay film.

8. The LCD of claim 1, wherein the reflective electrode has an opening defining the second area.

9. The LCD of claim 8, further comprising: a switching element formed on the first substrate; and a common electrode formed on either the first substrate or the second substrate.

10. A liquid crystal display (LCD) device, comprising:
a first substrate; a second substrate facing the first substrate; a liquid crystal cell formed between the first substrate and the second substrate; a liquid crystal layer disposed in the liquid crystal cell; a first area having a reflective electrode and having a first cell gap; a second area having an exposed portion of a transparent electrode, which is not overlapped with the reflective electrode, and having a second cell gap greater than the first cell gap; and wherein the second area is formed closer to a first corner of the pixel region than each remaining corner of the pixel region, and at least a portion of the second area overlaps a gate line or a data line, the gate line and the data line being formed on the first substrate to be connected to a switching element.

11. The LCD device of claim 10, wherein a direction from the center of the pixel region to the first corner of the pixel region substantially coincide with a rubbing direction for the pixel region.

12. The LCD device of claim 10, wherein the liquid crystal layer comprises liquid crystal molecules normally aligned substantially parallel to the first substrate.

13. The LCD device of claim 10, further comprising a light barrier pattern overlapping at least one side of the second area.

14. The LCD device of claim 13, wherein the light barrier pattern comprises: a first light barrier pattern overlapping a first side of the second area; and a second light barrier pattern overlapping a second side of the second area.

15. The LCD device of claim 14,
wherein a crossing of the gate line and the data line forms the first corner of the pixel region.

16. The LCD device of claim 15, wherein the first light barrier is extended along the gate line and the second light barrier is extended along the data line.

17. The LCD device of claim 10, wherein the reflective electrode is extended to cover a side of the second area.

18. The LCD device of claim 17, wherein the reflective electrode is extended to cover all sides of the second area.

19. The LCD device of claim 1, wherein the first cell gap is ranged between about 2.0 µm and about 2.5 µm and the second cell gap is ranged between about 3.3 µm and about 5.0 µm.

* * * * *